(12) United States Patent
Hartness et al.

(10) Patent No.: US 7,832,553 B2
(45) Date of Patent: Nov. 16, 2010

(54) HEAT-SHRINKABLE HOLDER FOR ARTICLES, HEAT-SHRINKABLE PACKAGE OF ARTICLES, HEAT-SHRINKABLE SLEEVE FOR ARTICLES, AND METHOD AND DEVICE FOR PACKAGING AND SLEEVING ARTICLES

(75) Inventors: Thomas P. Hartness, Greenville, SC (US); Mark W. Davidson, Greer, SC (US); John Loughlin, Charlotte, NC (US)

(73) Assignee: Illinois Tool Works Inc., Glenview, IL (US)

( * ) Notice: Subject to any disclaimer, the term of this patent is extended or adjusted under 35 U.S.C. 154(b) by 262 days.

(21) Appl. No.: 12/133,153

(22) Filed: Jun. 4, 2008

(65) Prior Publication Data

US 2008/0272013 A1 Nov. 6, 2008

Related U.S. Application Data

(63) Continuation of application No. 11/588,844, filed on Oct. 27, 2006, which is a continuation-in-part of application No. 11/384,031, filed on Mar. 17, 2006.

(51) Int. Cl.
*B65D 75/00* (2006.01)
(52) U.S. Cl. .................. 206/150; 206/432; 206/497; 206/820
(58) Field of Classification Search ............. 206/142, 206/143, 150, 151, 427, 432, 497, 459.5, 206/820; 294/87.2
See application file for complete search history.

(56) References Cited

U.S. PATENT DOCUMENTS

| | | | |
|---|---|---|---|
| 2,575,580 A | 11/1951 | Cadmus | |
| 3,112,826 A * | 12/1963 | Blum | 206/142 |
| 3,123,955 A | 3/1964 | Weissensee et al. | |
| 3,513,970 A * | 5/1970 | Eckholm, Jr. | 206/150 |
| 3,599,388 A | 8/1971 | Feingold | |
| 3,621,628 A * | 11/1971 | Chidsey, Jr. | 206/150 |
| 3,759,378 A | 9/1973 | Werth | |
| 4,175,994 A | 11/1979 | Norton et al. | |

(Continued)

FOREIGN PATENT DOCUMENTS

EP 0395370 A1 10/1990

(Continued)

OTHER PUBLICATIONS

Int'l Search Report from PCT/US2009/046240—8 pages, Oct. 6, 2009.

(Continued)

*Primary Examiner*—Luan K Bui
(74) *Attorney, Agent, or Firm*—Dority & Manning, P.A.

(57) ABSTRACT

A heat-shrinkable holder for securing articles, a package securing such articles using heat-shrinkable sheets, a shrinkable sleeve, and a method and device for securing such articles using heat-shrinkable sheets and sleeves are disclosed. The holder is constructed so that it is separable when desired, and may comprise the labeling or the like for an article to be packaged. Releasable fasteners such as adhesives, heat seals, and/or perforations may be employed on the sheets. If desired, articles may be individually sleeved with a heat shrinkable film blank portion, which may function as labeling.

21 Claims, 19 Drawing Sheets

U.S. PATENT DOCUMENTS

| | | | |
|---|---|---|---|
| 4,377,234 A | 3/1983 | Kaplan | |
| 4,392,056 A | 7/1983 | Weyandt | |
| 4,412,876 A | 11/1983 | Lerner et al. | |
| 4,467,207 A | 8/1984 | Lerner et al. | |
| 4,565,592 A | 1/1986 | Wehrmann et al. | |
| 4,620,888 A | 11/1986 | Easter et al. | |
| 4,680,205 A | 7/1987 | Lerner et al. | |
| 4,926,048 A | 5/1990 | Lerner et al. | |
| 4,944,825 A | 7/1990 | Gifford et al. | |
| 4,945,252 A | 7/1990 | Lerner et al. | |
| 5,059,114 A | 10/1991 | Stout et al. | |
| 5,177,931 A | 1/1993 | Latter | |
| 5,232,541 A | 8/1993 | Gifford | |
| 5,300,161 A | 4/1994 | Gifford | |
| 5,317,794 A | 6/1994 | Lerner et al. | |
| 5,373,618 A | 12/1994 | Doyle et al. | |
| 5,411,627 A | 5/1995 | Lerner et al. | |
| 5,433,057 A | 7/1995 | Lerner et al. | |
| 5,441,678 A | 8/1995 | Liebhart | |
| 5,442,851 A | 8/1995 | Lerner et al. | |
| 5,477,956 A | 12/1995 | Liebhart | |
| 5,483,783 A | 1/1996 | Lerner et al. | |
| 5,669,112 A | 9/1997 | Huang | |
| 5,685,053 A | 11/1997 | Deonarine et al. | |
| 5,697,489 A | 12/1997 | Deonarine et al. | |
| 5,766,390 A | 6/1998 | Jensen | |
| 5,820,714 A | 10/1998 | Lerner | |
| 5,941,052 A | 8/1999 | Evangelisti | |
| 6,145,656 A | 11/2000 | Marco | |
| 6,170,237 B1 | 1/2001 | Wipf | |
| 6,213,293 B1 | 4/2001 | Marco | |
| 6,415,917 B1 | 7/2002 | Marco | |
| 6,470,652 B1 | 10/2002 | Piron | |
| 6,564,530 B2 | 5/2003 | Marco | |
| 6,935,491 B2 | 8/2005 | Marco | |
| 7,021,036 B2 | 4/2006 | Hiramoto et al. | |
| 7,048,817 B1 | 5/2006 | Hammond | |
| 7,155,876 B2 | 1/2007 | VanderTuin et al. | |
| 2007/0215503 A1 | 9/2007 | Hartness et al. | |
| 2008/0272013 A1 | 11/2008 | Hartness et al. | |

FOREIGN PATENT DOCUMENTS

| | | |
|---|---|---|
| FR | 2637866 A1 | 4/1990 |
| FR | 2733733 A1 | 11/1996 |
| FR | 2 831 094 A | 4/2003 |
| FR | 2832985 A1 | 6/2003 |
| WO | WO 96/33924 | 10/1996 |
| WO | WO 97/21608 | 6/1997 |
| WO | WO 02/29768 | 4/2002 |
| WO | WO 2005/021405 | 3/2005 |
| WO | WO 2008/052211 | 5/2008 |

OTHER PUBLICATIONS

Co-Pending U.S. Appl. No. 11/384,031, filed Mar. 17, 2006.
Co-Pending U.S. Appl. No. 11/588,844, filed Oct. 27, 2006.
International Search Report for PCT/US2007/082797 mailed May 2, 2008—4 pages.
Abstract of FR 2637866, published Apr. 20, 1990.
Abstract of FR 2733733, published Nov. 8, 1996.
Abstract of FR 2832985, published Jun. 6, 2003.

* cited by examiner

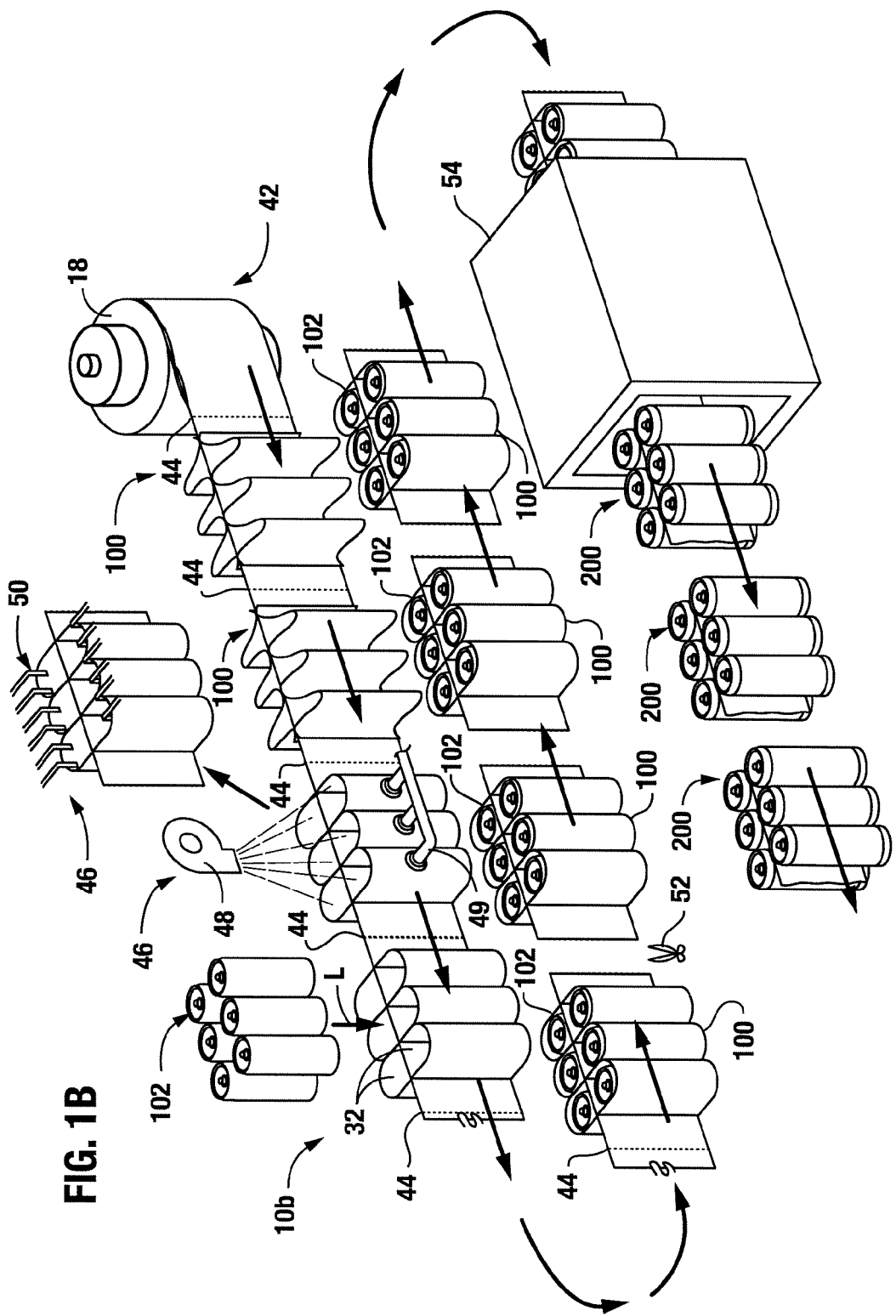

HEAT-SHRINKABLE HOLDER FOR ARTICLES, HEAT-SHRINKABLE PACKAGE OF ARTICLES, HEAT-SHRINKABLE SLEEVE FOR ARTICLES, AND METHOD AND DEVICE FOR PACKAGING AND SLEEVING ARTICLES

CROSS REFERENCE TO RELATED APPLICATIONS

The present application a continuation application of application Ser. No. 11/588,844, filed Oct. 27, 2006, which is a continuation-in-part of application Ser. No. 11/384,031, filed Mar. 17, 2006. Applicants claim priority to both applications and incorporate both applications herein by reference.

TECHNICAL FIELD

The present invention relates generally to a heat-shrinkable holder for securing articles, a package securing such articles using heat-shrinkable sheets, a sleeve for articles, and a method and device for securing such articles using heat-shrinkable sheets and/or for sleeving articles.

BACKGROUND

Articles such as beverage containers are often secured together using thermoplastic ring-type carriers. Some such carriers are sometimes known as "six-pack" carriers, although carriers for holding various numbers of containers have been used. Typically, such carriers comprise a flexible plastic, for example made from a low-density polyethylene. The carriers have openings formed smaller than the containers. The carriers are stretched over a suitably positioned group of the containers. When released, the openings conform to the sides of the containers, thereby unitizing the containers into a package.

The characteristics of the plastics used in such stretch-loaded carriers are such that it can be difficult to remove individual containers or groups of containers together due he the amount of force required. In particular, the complexity of manufacture and use of such carriers increases substantially with the number of containers being held by the carrier. Also, the carriers used are generally small strips, located around the top portion of the containers, for example along a ridge at the top of a can. The plastics are thus not susceptible to carrying printed indicia, and are typically not sufficiently transparent or translucent so as to allow the view of any indicia on the containers being held. Also, a fair amount of force and complicated machinery is required to stretch the carriers so as to place them over the containers. Therefore, although stretch-loaded carriers have been used for many years, various drawbacks do exist with regard to stretch-loaded carriers.

In conventional shrink-wrapping, a load is fed to a wrapping zone in which a shrink-wrap film is placed on the load in some fashion. The film is cut into pieces or sheets before or during the placement on the load. Typically, the film makes a complete revolution around the load so that two cut ends overlap. The load and film are then passed into a heating tunnel causing the film to shrink and compress against the load. Typically, the film is cut into sheets large enough to allow for some overlap between edges when placed on the load. During the heating process, the edges may therefore be sealed together forming a unitary package.

Groups of articles such as containers have been wrapped with shrink-wrap in such fashion previously. However, due to the nature of conventional shrink-wrapping, the film extends only around the outside of the articles. Therefore, individual articles may not be removed without compromising the integrity of the entire package, and individual articles may contact each other while packaged, possibly leading to damage. To address issues such as these, sometimes, articles are even placed in a first container such as a box or a stretch wrap carrier, and then shrink-wrapped. Such packaging adds cost and wastes material.

Accordingly, an improved holder for articles such as containers, an improved package of unitized containers, and improved methods and devices of packaging would be welcome, addressing one or more of the above drawbacks of conventional packaging technology, and/or other disadvantages of currently available technology.

SUMMARY

According to certain aspects of the disclosure, a heat-shrinkable holder for securing a plurality of articles includes at least a first and second blank strips. Each first and second blank strip includes a first sheet formed of heat-shrinkable material and having a pre-shrinking length; and a second sheet formed of heat-shrinkable material substantially equal to the first sheet pre-shrinking length, the second sheet being joined to the first sheet at discrete joinder locations so as to create at least two openings therebetween, each of the openings sized larger than one of the articles, the first and second sheets including perforations at the discrete joinder locations. Releasable fastener portions are provided for holding the first blank strip to the second blank strip, the releasable fastener portions being located between the second sheet of the first blank strip and the first sheet of the second blank strip at locations spaced from the perforations. Each of the first and second sheets are heat-shrinkable to an extent to secure one of the articles on each opening, a portion of one of the first sheets and a portion of one of the second sheets securing one of the articles being removable from the holder by tearing at the perforations and by release of the releasable fastener portion. Various options and modifications are possible.

For example, the holder may be configured with six openings for securing six articles in a two-by-three arrangement, and the articles may be arranged so that they do not contact each other directly when secured. At least one of the first or second sheets may include printed indicia relating to the article. The portion of the first sheet and the portion of the second sheet removed with the article may comprise a label for the article. The first and second sheets may be joined via at least one of heating or an adhesive. The holder may further include an extending handle. The articles may be containers, and the perforations and releasable fastener portions may be located so that upon removal of the portion of the first sheet, the portion of the second sheet and the article, the holder and remaining articles are an intact package and no waste holder material is generated.

According to other aspects of the disclosure, a package of articles may include a plurality of articles, at least a first and second blank strips, each first and second blank strip including a first sheet formed of heat-shrinkable material and having a pre-shrinking length; and a second sheet formed of heat-shrinkable material substantially equal to the first sheet pre-shrinking length, the second sheet being joined to the first sheet at discrete joinder locations so as to create at least two openings therebetween, each of the openings sized larger than one of the articles, the first and second sheets including perforations at the discrete joinder locations. Releasable fastener portions may be provided for holding the first blank strip to the second blank strip, the releasable fastener portions being located between the second sheet of the first blank strip and the first sheet of the second blank strip at locations spaced from the perforations; each of the first and second sheets being heat-shrinkable to an extent to secure one of the articles on each opening, a portion of one of the first sheets and a portion of one of the second sheets securing one of the articles being removable from the holder by tearing at the perforations and by release of the releasable fastener portion. Again, various options and modifications are possible.

According to other aspects of the disclosure, a package of articles includes a plurality of articles; and a holder including at least four sheets of heat-shrunken material having substantially equal pre-shrinking lengths, the sheets being joined at a plurality of discrete joinder portions thereby forming a plurality of openings arranged in at least two rows, perforations being formed at the joinder portions and releasable fastener portions being formed between the innermost two sheets spaced from the perforations, each opening sized to secure an article therein, the heat-shrunken material and articles thereby forming a unitary heat-shrunken package configured with a plurality of articles arranged in at least two rows, individual articles being separable from the package by tearing at a respective one of the perforations once separating at a respective one of the releasable fasteners without generating waste holder material. As above, various options and modifications are possible.

A heat-shrinkable holder for securing a plurality of articles is also disclosed, the holder including at least four sheets of heat-shrunken material having substantially equal pre-shrinking lengths, the sheets being joined at a plurality of discrete joinder portions thereby forming a plurality of openings arranged in at least two rows, perforations being formed at the joinder portions and releasable fastener portions being formed between the innermost two sheets spaced from the perforations, each opening sized to secure an article therein, the heat-shrunken material and articles thereby forming a unitary heat-shrunken package configured with a plurality of articles arranged in at least two rows, individual articles being separable from the package by tearing at a respective one of the perforations once separating at a respective one of the releasable fasteners without generating waste holder material. Again, various options and modifications are possible.

According to other aspects of the invention, a method of packaging articles is disclosed, including creating a first and second blank strip by joining a first sheet of heat-shrinkable material and a second sheet of heat-shrinkable material at discrete joinder portions spaced along the first and second sheet so as to form a plurality of openings, each opening located between each adjacent pair of joinder portions; perforating the first and second sheets at the discrete joinder portions; joining the first and second blank strips by applying a releasable fastener to the first and second blank stops spaced from the perforations; inserting an article into each of the openings; separating the sheets and articles at predetermined locations into groups of articles; and heating the first and second sheets to shrink the first and second sheets thereby forming a unitary package of the sheets and the groups of inserted articles. Various options and modifications are available.

For example, the joining step may be achieved by applying an adhesive. Also, the method may further include opening the openings before the inserting step. The opening step may also include blowing a gas into the openings. The blowing step may be performed by a separator inserted into the openings during at least part of the blowing step, and the separator may be removed as the article is inserted.

According to other aspects of the disclosure, a device is disclosed for placing a pre-made shrink-wrap blank on articles, the device including a conveyor belt for conveying a plurality of the articles, a feed for feeding the shrink-wrap blank to the articles, a guide for sliding the blank onto the articles with articles sliding into openings in the blank, a separating device for separating the plurality of articles from each other along with respective portions of the blank by separating the blank into portions at predetermined locations, and a heat source for shrinking the discrete groups of articles and respective blank portions to the article. As above, various options and modifications are possible.

For example, a separator may blow a fluid into the openings in the blanks to assist in opening the openings for the articles, and the separator may include extending elements driven along a track, the extending elements extending into the openings to assist in opening the openings for the articles. The portion of the blank may be disposed around only one article, and may also comprise a label for the article. If desired, the portion of the blank may be disposed around a plurality of articles, thereby forming a package of articles secured by the shrunken blank portion.

A method of attaching heat-shrinkable sleeves on articles includes creating a blank strip by joining a first sheet of heat-shrinkable material and a second sheet of heat-shrinkable material at discrete joinder portions spaced along the first and second sheet so as to form a plurality of openings, each opening located between each adjacent pair of joinder portions; perforating the first and second sheets at the discrete joinder portions; inserting an article into each of the openings; separating the sheets and articles at the joinder portions to form a sleeve about each article made from a portion of the first sheet and a portion of the second sheet; and heating the sleeve, thereby shrinking the sheet portions to secure them to the respective article. Again, various options and modifications are possible.

For example, the creating step may include creating perforations at the joinder portions to assist in the separating step, and/or the shrunken sleeve may comprise a label for the article.

BRIEF DESCRIPTION OF THE DRAWINGS

FIG. 1B is a perspective schematic view of one possible line configuration of a line for placing articles in heat-shrinkable holders so as to create a package.

DETAILED DESCRIPTION OF THE PREFERRED EMBODIMENTS

Figure 1A:
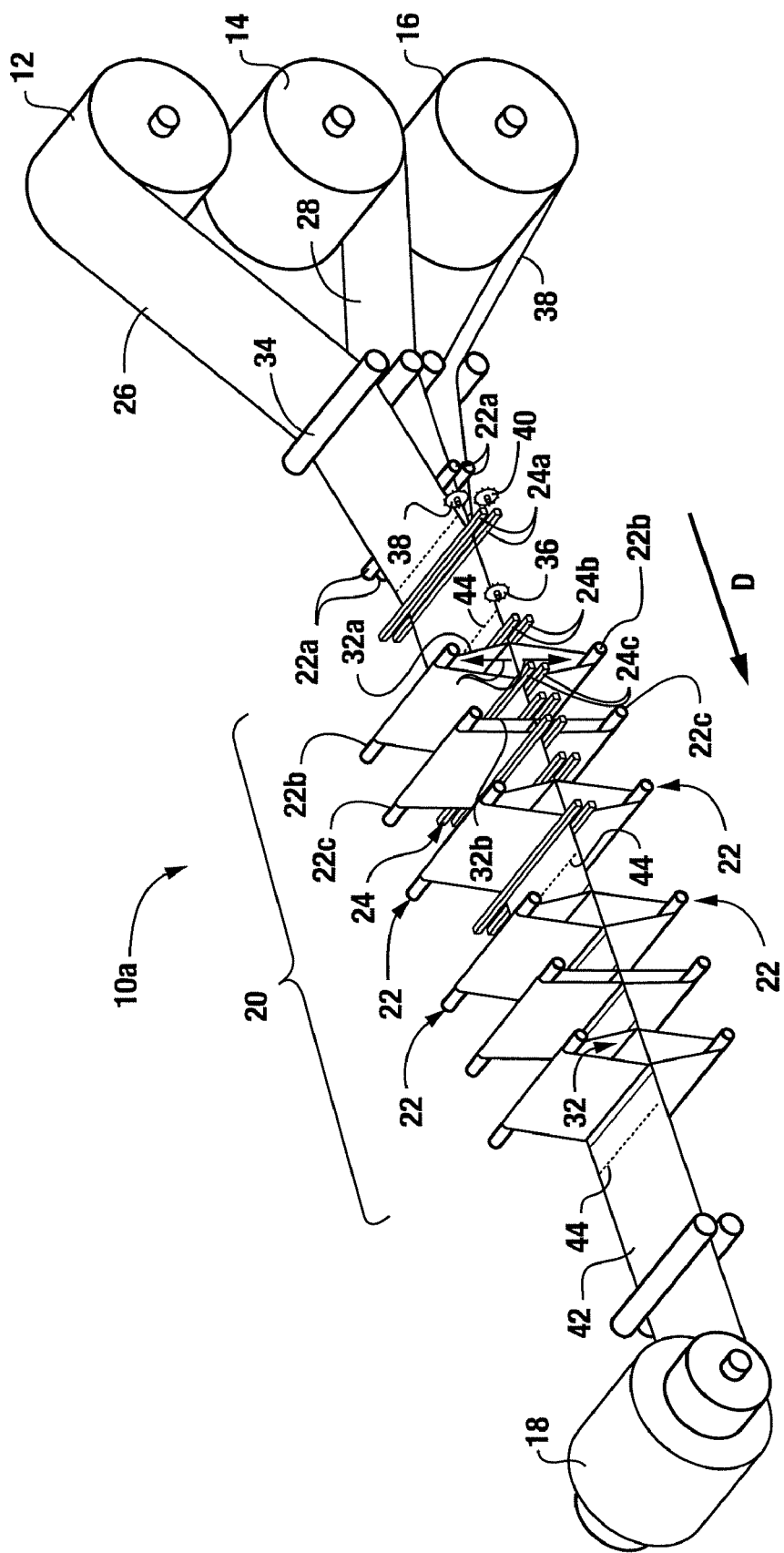
FIG. 1A is a perspective schematic view of one possible line configuration of a line for manufacturing heat-shrinkable holders according to certain aspects of the present disclosure.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. In discussing various embodiments, like or similar reference numerals are used below with like or similar parts of various embodiments.

As described herein, a shrink-wrapping material may be used to form holder for articles. Preferably, the holder is formed from at least two sheets of the heat shrinkable material for holding at least one row of articles. However, more sheets and various configurations could be employed. For example, three sheets could be used for two rows of articles, as in a conventional six-pack (two by three) arrangement. If desired the sheets may have different properties, and all sheets need not be heat-shrinkable. For example, one of two sheets may be heat shrinkable, or two of three sheets may be heat shrinkable, as discussed below. The non-shrinkable sheets may be provided for structural stability (for example, use as a center sheet or a handle), for carrying printed indicia, or for other purposes. The present disclosure also includes various packages for holding articles, and methods for creating such holders and packages.

FIGS. 1A through 3 disclose one possible method for manufacturing such holders and creating such packages. The example used therein is for a conventional six-pack of cans. It should be understood also that the present invention has utility with various articles, not just containers, and with various containers, not just cans, as shown.

Figure 2A:
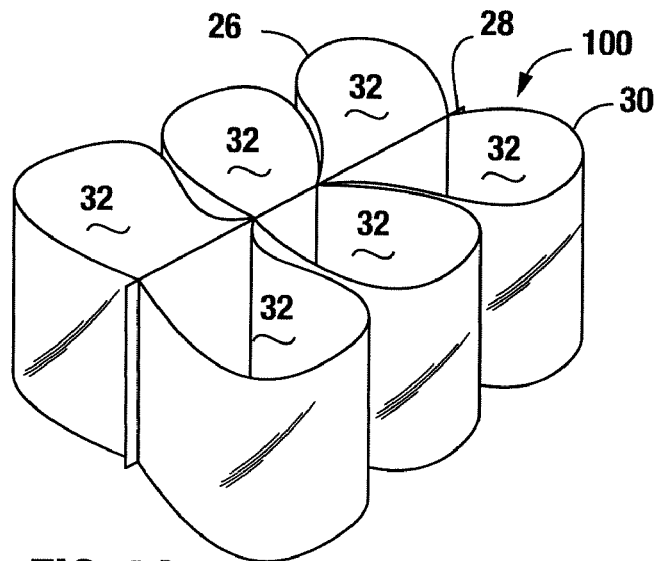
FIG. 2A is a perspective view of one example of an empty heat shrinkable holder.

More particularly, FIG. 1A is a perspective schematic view of one possible line configuration of a line for manufacturing heat-shrinkable holders, an example of which is shown in FIG. 2A. As shown in FIG. 1A, line 10a includes film supply rolls 12, 14, 16 at one end and take up roll 18 at the other. Between the rolls lies a forming zone 20, where film from rolls 12, 14, 16 is formed into holders for articles.

Forming zone 20 includes spreaders 22 and sealers 24. As shown in FIG. 1A, spreaders 22 are rods inserted between films 26, 28, 30 to create openings 32. At the rightmost end of forming zone 20, spreaders 22a are being inserted between the films 26, 28, 30, closely adjacent to film 28. Spreaders 22 generally travel along direction D with the films once inserted. By the time spreaders 22a move along direction D and reach the position of spreaders 22b, spreaders 22a will have moved outward from film 28 in the directions of arrows O. Simultaneously sealers 24 are sealing films 26 and 30 to film 28. As illustrated, sealers 24 are heat-sealing devices, although other devices could be used to seal the films together, such as adhesive applying devices. Sealers 24a hold and seal the films 26, 28, 30 together thereby forming joinder portions while spreader 22a moves to the position of spreader 22b. Then, another sealer 24 (not shown) will contact films 26, 28, 30 and seal them together to create another opening (not shown) upstream from opening 32a.

As shown, each opening 32 is formed by one spreader 22 and two sealers 24. It is also possible to form adjacent openings utilizing common sealers 24 between them. Therefore, only one sealer set 24 could be provided above and below the films between openings 32a and 32b, for example. Such sealer set could make a single point contact, thereby changing the shapes of the openings a bit to widen them, or could extend along direction D between openings 32a and 32b and seal the entire area between sealers 24b and 24c. All openings 32 need not be the same size. For example, the outermost openings may be larger than the center opening in a common six pack arrangement (not different sizes of openings being formed in FIG. 1A). Thus, the loops of film 26 may have different sizes along a given holder. Making the central loops smaller may help pull the resulting package together more tightly during heat-shrinking.

Spreaders 22 and sealers 24 should remain in contact with films 26, 28, 20 long enough to reliably seal them together to form a blank 42. The amount of contact time may vary according to line speed, sealer type (heat versus adhesive), sealer temperature, film properties, etc. FIG. 1A shows only one of the possible arrangements of spreader 22 and sealer 24 contact ranges.

Spreaders 22 and sealers 24 may be moved laterally, vertically, pivotally, or some combination, into and out of place, by suitable motors, drives, etc. For example, the spreaders and sealers may be mounted on a rotating device that places the elements in the upstream position, drives them in direction D, removes them in the downstream position, and then returns them to the upstream position. A programmable logic controller, motors and sensors can be used to control such movement as desired. Various guide rollers 34, which may be driven or idlers, may be provided to guide the films thorough line 10a. The films may be paid off rolls 12, 14, 16 at different speeds to account for the different lengths of films used in forming zone 20. That is, more of films 26 and 30 is needed than of film 28, as configured in FIG. 1A. Some or all of the film supply rolls 12, 14, 16 may therefore be driven, and other flow controlling structures such as gimballing rollers or the like may be used.

Perforating devices 36, 38, and 40, schematically shown in FIG. 1A, may also be employed, if desired. As shown, perforating device 36 perforates all three films 26, 28, 30, so as to allow for division of the films into separate holders. Perforating device 38 perforates film 26, and perforating device 40 perforates film 30. These latter perforations allow individual articles to be removed from the formed holders later. Perforating devices 36, 38, 40 may be linearly or rotationally moving knife devices. Controllers and servomotors and the like may cause the perforating devices to operate at desired times, to achieve perforations where desired in the films.

Take up roll 18 may be eliminated if desired, and line 10a of FIG. 1A may lead directly to line 10b of FIG. 1B. Alternatively, take up roll 18 may be replaced by a box or the like, with the film material being fan folded in place. Use of a box may provide easier splicing and change out opportunities, while use of a roll may provide more secure control and denser packaging. Either is an acceptable modification of that shown.

FIG. 1B is a perspective schematic view of one possible line configuration of a line 10b for placing articles in heat-shrinkable holders so as to create a package. As stated, lines 10a and 10b may be merged into one line, eliminating the need for use of take up rolls 18, if desired. As shown, roll 18 supplies blank 42 material, comprising in FIG. 1B adjacent six-pack holders 100 separated by perforations 44 formed by device 36. Blank 42 travels to an opening station 46, where an opener such as a blower 48, a suction device 49, or a mechanical finger device 50, or some combination of both opens the openings 32 of holders 100. Articles 102 are then loaded into openings 32 (see arrow L). As shown, six cans are vertically moved into the openings 32. However, the articles may instead be vertically stationary and the blank material may be placed over the articles from above or below, if desired. Blank 42 is then separated at perforations 44 by a divider 52 to form individual loaded holders. It is possible to not make the perforations where illustrated in line 10a, and to simply cut the blank 42 when indicated in line 10b. The loaded holders 100 are then passed into a heating device 54 such as a heat tunnel. Any of the films within the holders 100 that are heat-shrinkable will then contract, forming unitary packages 200.

If desired, packages 200 may be further combined in various ways, such as by heat sealing or shrinking or adhesives to create still larger packages. For example, two six packs could be combined to create a twelve pack (see FIG. 5B); four six packs could be combined to create a case, etc. Also, packages 200 may be connected vertically.

It should be understood that the representations of FIGS. 1A and 1B are not intended to be to scale and are schematic illustrations only. It should also be understood that the line 10a need not use three films; any number of films greater than two may be employed with modification of the line. For example, two films could be used to create a linear collection of articles. Four or five films could be used to create a grouping of articles three across (as opposed to two across). Modifications to the heat sealing and possible use of adhesives, whether heat activated, heat cured, contact adhesives, or otherwise, could be used to create larger arrays of openings and larger packages.

Figure 2B:
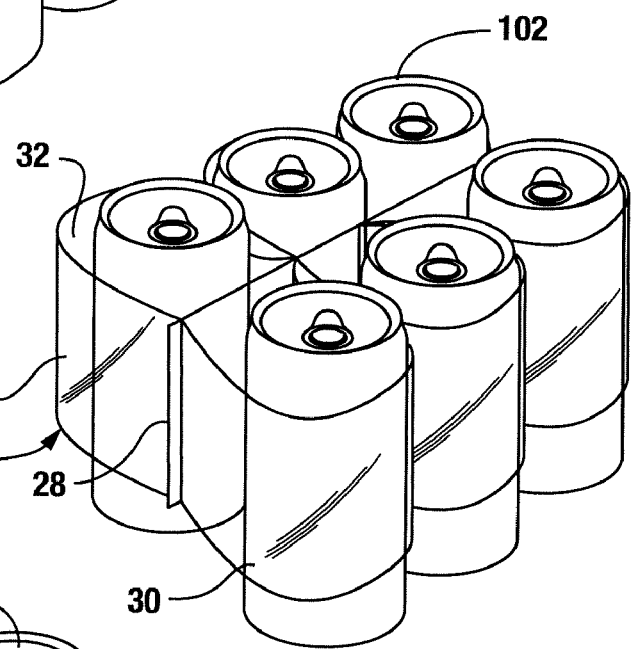
FIG. 2B is a perspective view of the heat shrinkable holder as in FIG. 2A, with articles located within the openings of the holder, before heat-shrinking.
Figure 2C:
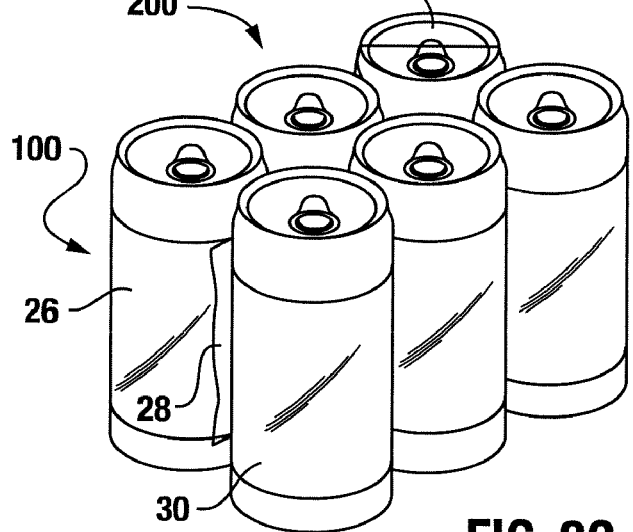
FIG. 2C is a perspective view of the holder and articles as in FIG. 2B, after heat-shrinking.

FIGS. 2A-2C show enlarged views of a holder 100 and articles 102, in this case cans. FIG. 2A shows a holder 100, as separated along perforations 44. It would be possible to separate the holders 100 before filling them with articles 102, if desired. FIG. 2B shows six articles 102 in openings 32 of holder 100 before heat shrinking. FIG. 2C shows unitized package 200 after heat shrinking. FIGS. 2B and 2C illustrate that heat-shrinking can beneficially cause the articles 102 to be pulled together in two perpendicular dimensions, that is along the line of central film 28 and perpendicular to it. This shrinking helps ensure a solid unitized package 200. Adjacent articles 102 all have film between their sides to the will not "clank" into each other, possibly damaging the articles during handling or shipping. This is especially useful if the articles are containers, such as glass bottles. Also, the heat shrinking maintains the articles in a solid formation, as opposed to certain container holders where the bottoms of the containers may swing out from the tops when moved about. Again, the disclosed holder 100 prevents such swinging, and potentially prevents damage resulting therefrom. Articles are unlikely to slip out of holder 100 due to the tensions caused by heat shrinking, making them easy to handle and carry. Also, the resulting unitary package can be readily stacked and or used in displays. Because each article is packaged in its own heat-shrunken opening, individual containers are readily removed without damaging the integrity of the rest of the package.

Figure 3:
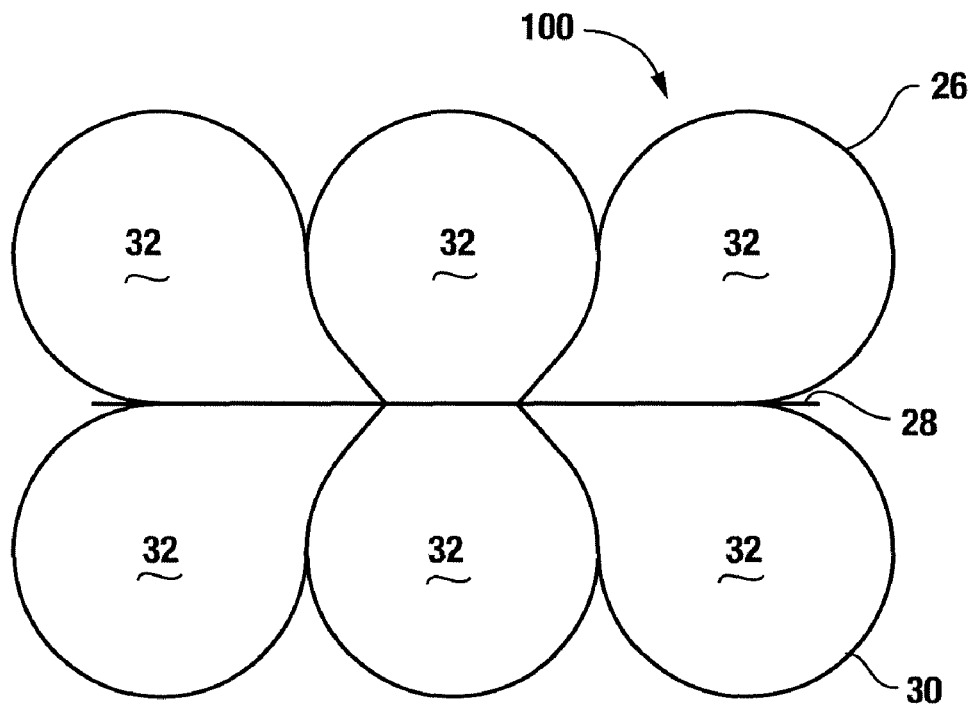
FIG. 3 is a top view of a heat-shrunken holder as in FIG. 2C, with the articles removed for clarity.

FIG. 3 is a top view of a heat-shrunken holder 100 as in FIG. 2C, with the articles removed for clarity. As seen, shrinking along the central line followed by film 28 helps draw the six containers in to form a unitized shape, with all adjacent containers having at least one buffering piece of film between them for protection. As can be seen, the amount of film used from films 26 and 30 is much greater than from central film 28, and the outermost openings 32 are larger than the central openings. Based on the size and shape of the articles to be packaged, the operation of forming zone 20 can be readily designed so as to achieve a desired resulting configuration. The amount of film used for outer films 26 and 30 may thus be two times more than that of film 28, and could be as much as four or more times greater as well, depending on the application.

Figure 4A:
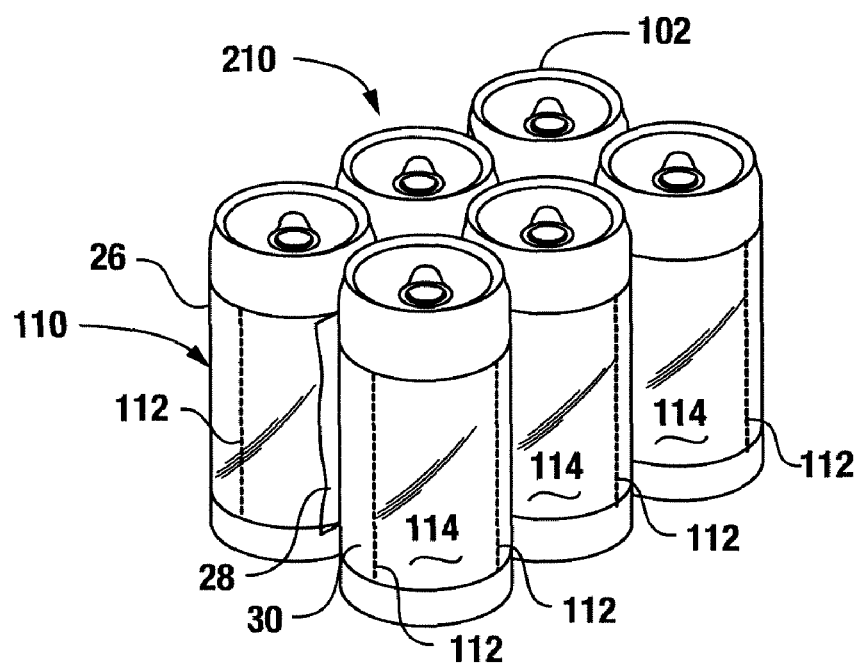
FIG. 4A is a perspective view of an alternate heat-shrunken holder and articles, as in FIG. 2C, wherein the holder includes perforations for assisting in removing individual articles.

FIG. 4A is a perspective view of an alternate package 210 including heat-shrunken holder 110 and articles 102, as in FIG. 2C, wherein the holder includes additional perforations 112 for assisting in removing the individual articles. Perforations 112 are made by devices 38 and 40 in line 10a, as discussed above. As shown, two perforations 112 are provided for each article 102, but more or fewer may be provided. Also, the area of film 114 between the perforations may be bonded to the article 102, if desired, for example, by an adhesive that could be applied to the film or article, or activated during heat shrinking or otherwise. Thus, the holder 100 would provide a label for the article 102 via film piece 114, eliminating the necessity of separately labeling the article. (See FIG. 4E below for printed indicia on film).

Figure 4B:
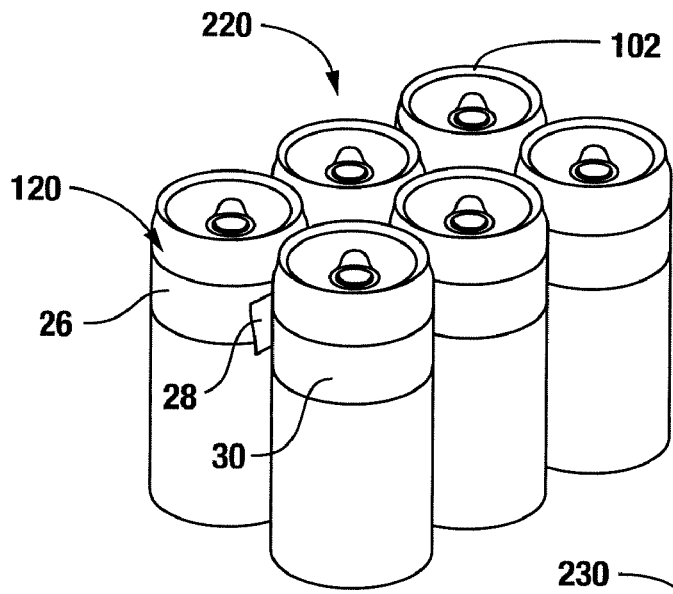
FIG. 4B is a perspective view of an alternate heat-shrunken holder and articles, as in FIG. 2C, wherein the holder has a smaller vertical dimension.

FIG. 4B is a perspective view of an alternate heat-shrunken package 220 including holder 120 and articles 102, as in FIG. 2C, wherein the holder has a smaller vertical dimension. If desired, holder 120 may thus cover less of the articles, but the protective abilities may be lessened at some point with a smaller holder. Also, the holder may be placed around a bottle neck or along a can ridge, if desired.

Figure 4C:
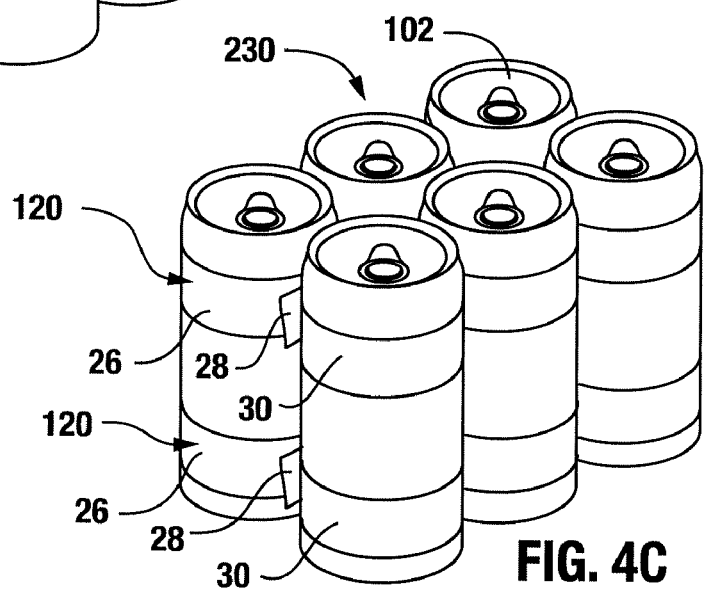
FIG. 4C is a perspective view of an alternate heat-shrunken holder and articles, as in FIG. 2C, wherein the articles are held by two holders as in FIG. 4B.

FIG. 4C is a perspective view of an alternate heat-shrunken package 230 including holder 120 and articles 102, as in FIG. 2C, wherein the articles are held by two holders 120 as in FIG. 4B. Use of two smaller holders 120 requires less film than holder 100 and addresses protection issues noted above, although assembly of the package 230 may be more complex.

Figure 4D:
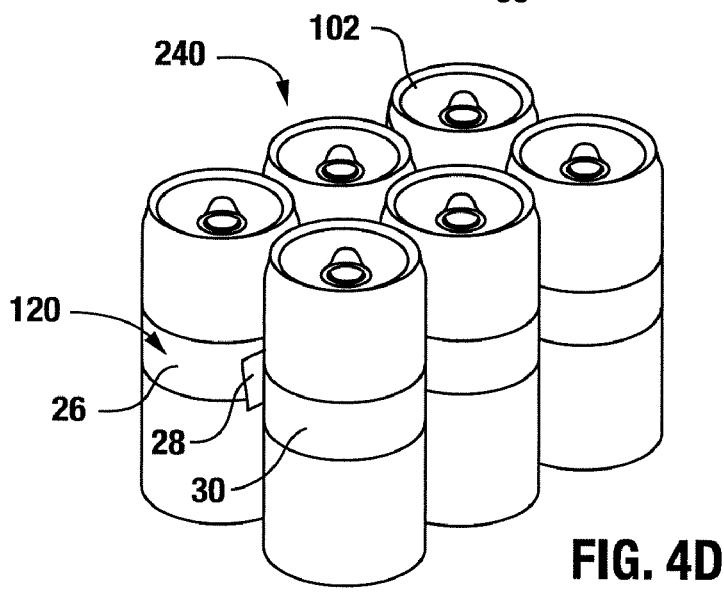
FIG. 4D is a perspective view of an alternate heat-shrunken holder and articles, as in FIG. 2C, wherein the holder is smaller and centrally located vertically along the articles.

FIG. 4D is a perspective view of another alternate package 240 including a heat-shrunken holder 120 and articles 102, as in FIG. 2C, wherein the holder is smaller and centrally located vertically along the articles. Central location of a smaller holder may also address protection issues while reducing material used.

Figure 4E:
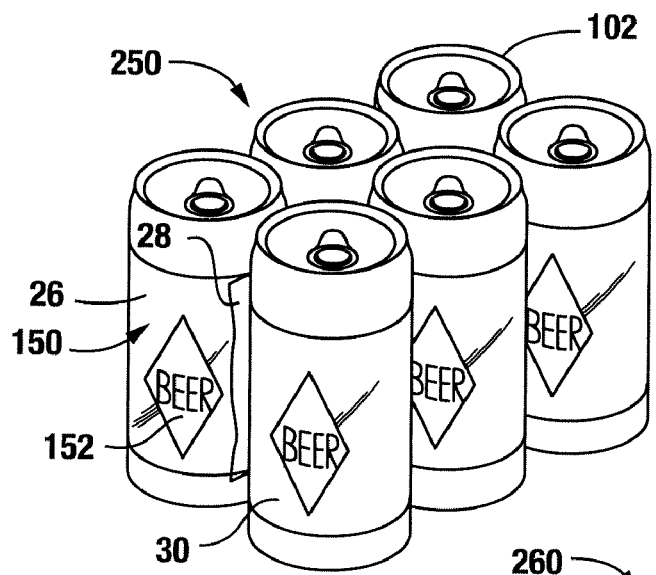
FIG. 4E is a perspective view of an alternate heat-shrunken holder and articles, as in FIG. 2C, wherein the holder includes printed indicia thereon.

FIG. 4E is a perspective view of an alternate package 250 including a heat-shrunken holder 150 and articles 102, as in FIG. 2C, wherein the holder 150 includes printed indicia 152 thereon. The printed indicia 152 may be individual elements or a common element across the various articles or across multiple packages, as desired. Thus all article labeling or supplemental article labeling may be accomplished via the package holder portion.

Figure 4F:
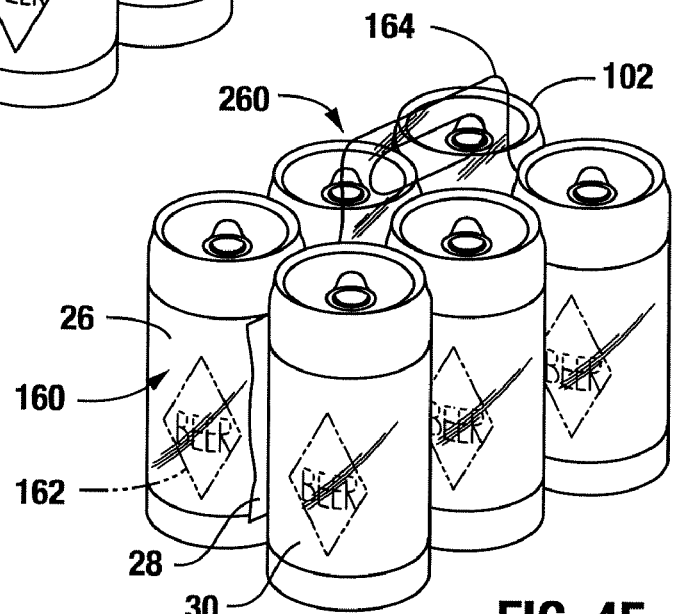
FIG. 4F is a perspective view of an alternate heat-shrunken holder and articles, as in FIG. 2C, wherein printed indicia on the articles may be seen through at least a portion of the holder, and including an optional handle.

FIG. 4F is a perspective view of an alternate package 260 including a heat-shrunken holder 160 and articles 102, as in FIG. 2C, wherein printed indicia 162 on the articles 102 may be seen through at least a portion of the holder, and including an optional handle 164. In this embodiment, the outer films 26 and 30 would be at least partially translucent or transparent in whole or part. If such a handle 164 were provided, it could be part of a film, such as central film 28 as shown, or an entirely separate piece attached in some way, such as via heat or adhesive. Handle 164 could need to be made of a more robust and/or less or non-shrinkable film or other material, depending on the size and weight of the package.

Figure 4G:
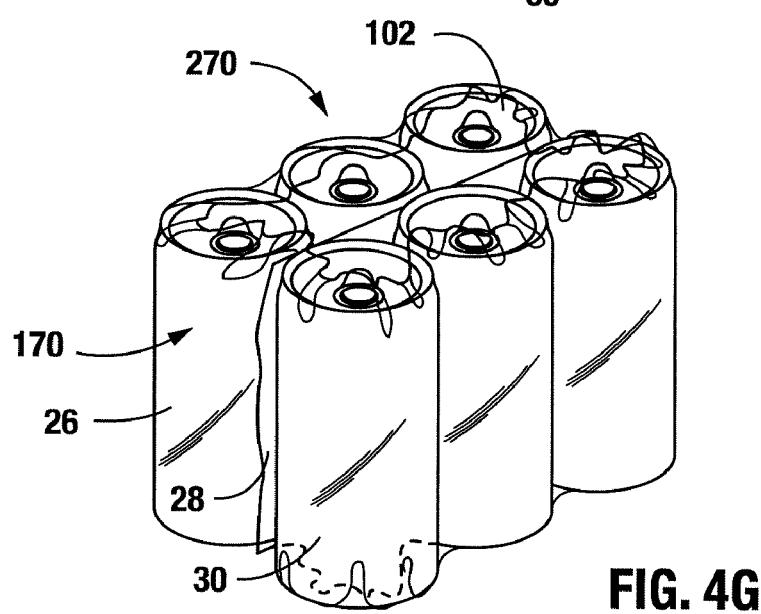
FIG. 4G is a perspective view of an alternate heat-shrunken holder and articles, as in FIG. 2C, wherein the holder extends along the entire side surfaces and at least partially onto the top and bottom surfaces of the articles.

FIG. 4G is a perspective view of an alternate package 270 including heat-shrunken holder 170 and articles 102, as in FIG. 2C, wherein the holder extends along the entire side surfaces and at least partially onto the top and bottom surfaces of the articles. Thus, as shown, the articles 102 are substantially wrapped and secured in three dimensions using holder 170.

Figure 5A:
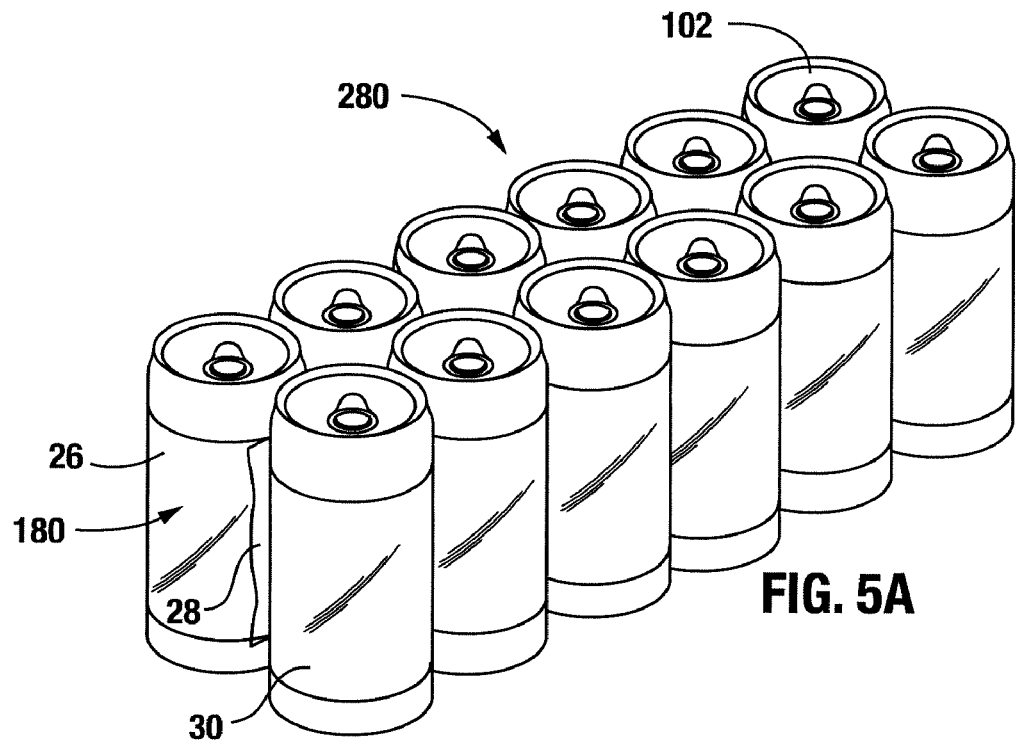
FIG. 5A is a perspective view of an alternate heat-shrunken holder and articles, as in FIG. 2C, wherein the holder holds more articles in a two by six arrangement.
Figure 5B:
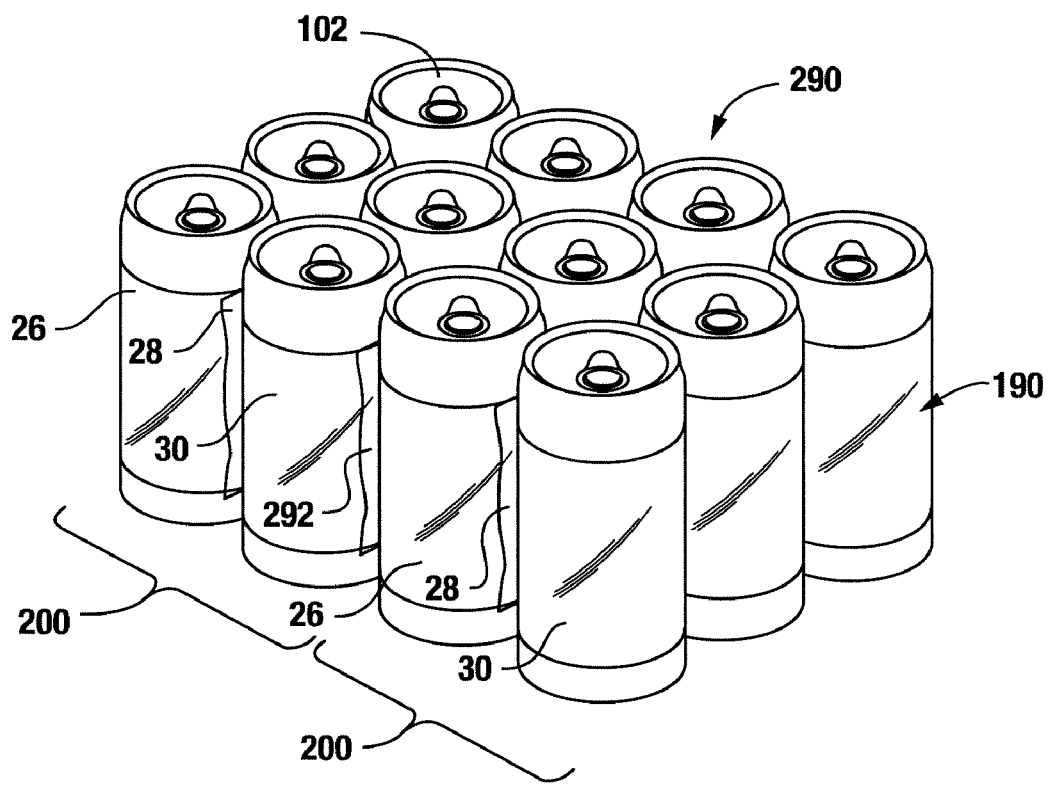
FIG. 5B is a perspective view of an alternate heat-shrunken holder and articles, as in FIG. 2C, wherein the holder holds more articles in a three by four arrangement.

FIG. 5A is a perspective view of an alternate package 280 including a heat-shrunken holder 180 and articles 102, wherein the holder holds articles in a two by six arrangement. Thus, it should be understood that various arrangements of articles is possible. For example, as further shown in FIG. 5B alternate package 290 includes a heat-shrunken holder 190 and articles 102, wherein the holder holds articles in a three by four, twelve-pack arrangement. Such arrangement can be achieved in various ways, and in various steps as mentioned above. As shown herein, the package 290 is essentially equivalent to two side-by-side six pack packages 200, with an added film layer 292 therebetween. Layer 292 could be applied via heat and/or adhesive. Alternatively, the entire twelve article holder 190 could be constructed in one pass on a modified version of line 10a.

Figure 6A:
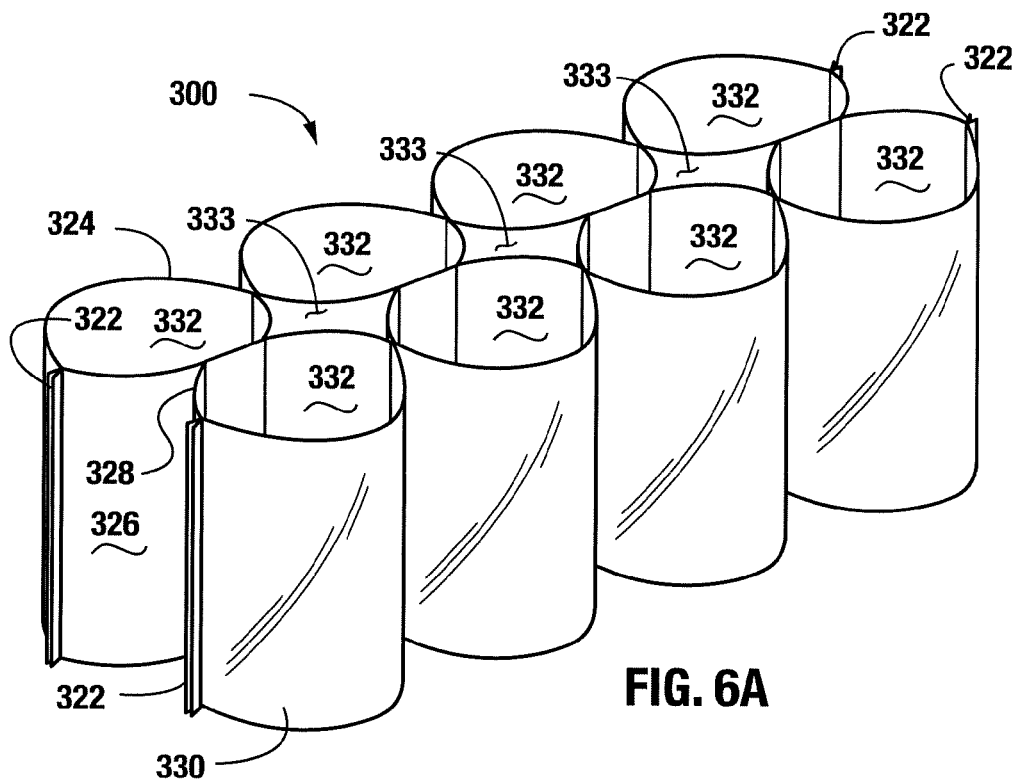
FIG. 6A is a perspective view of an alternate empty heat-shrinkable holder.
Figure 6B:
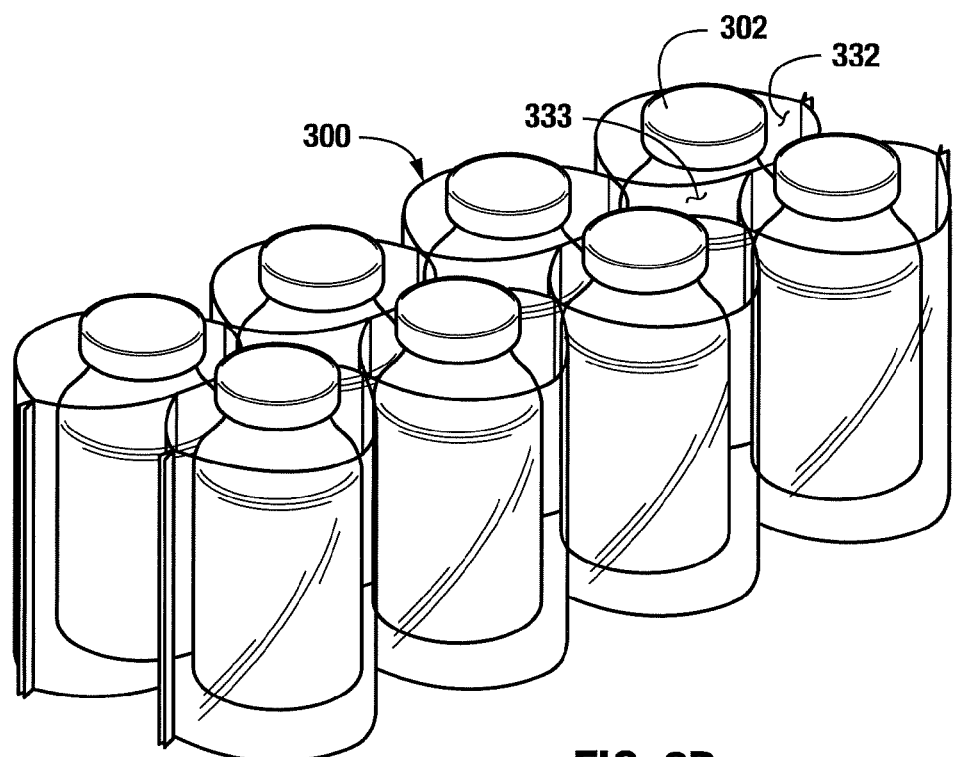
FIG. 6B is a perspective view of the heat shrinkable holder as in FIG. 6A, with articles located within the openings of the holder, before heat-shrinking.
Figure 6C:
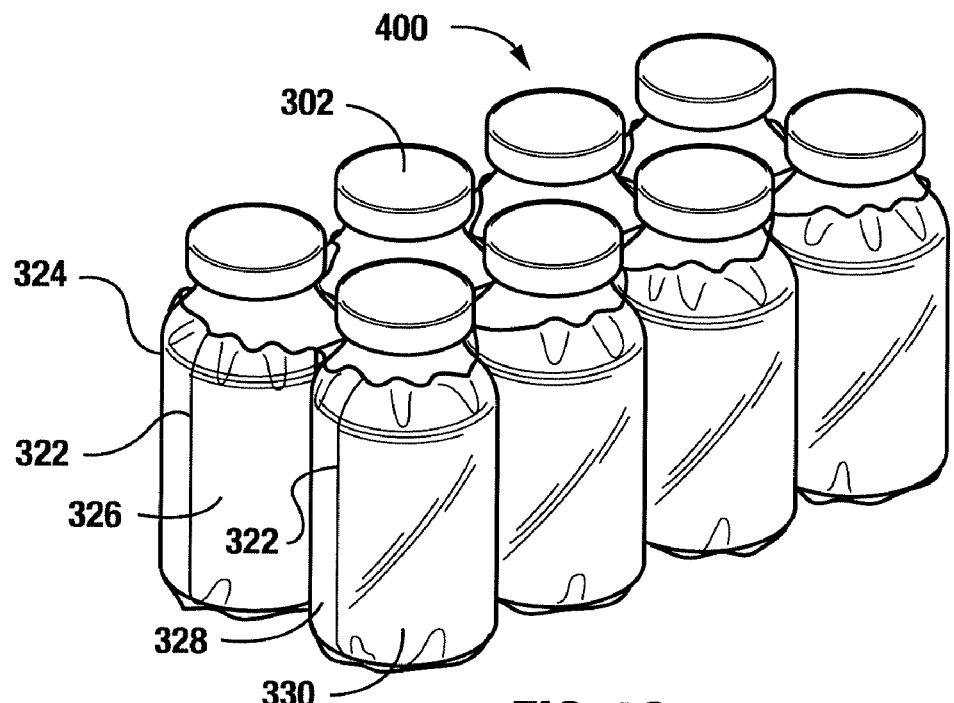
FIG. 6C is a perspective view of the holder and articles as in FIG. 6B, after heat-shrinking.

FIGS. 6A-6C show enlarged views of an alternate holder 300 and articles 302, in this case bottles. Holder 300 is made from four sheets of film, 324, 326, 328, 330. Holder 300 may be formed from a blank holding a plurality of such holders, separable along perforations, such as perforations 44 discussed above. Separation of holders 300 results in two edges 322 at each end of the holder. As shown, holder 300 has eight openings 332 for receiving the articles 302, although as discussed above, practically any number could be employed. Other openings 333 are created by the manufacturing process, but these are not necessarily sized to accept articles 302, or at least articles of the same size. FIG. 6B shows eight articles 302 in openings 332 of holder 300 before heat shrinking. FIG. 6C shows unitized package 400 after heat shrinking. As with FIGS. 2B and 2C above, heat-shrinking can cause the articles 302 to be pulled together in two perpendicular dimensions, helping ensure a solid unitized package 400. Adjacent articles 302 all have film between their sides, as above, and each article is again packaged in its own heat-shrunken opening so that individual containers are readily removed without damaging the integrity of the rest of the package.

Holder 300 beneficially includes sheets of substantially equal length between edges 322. Such equal sheet length allows holder 300 or a blank of multiple holders to lie flat or be readily rolled. In some applications, such abilities may be desirable, as compared to the holders described above.

It should be understood that although holder 300 is illustrated as having four sheets and eight openings, various different sizes are possible. For example, holder 300 could have two sheets holding a linear grouping of articles, or could have six or eight sheets, holding wider groupings.

Figure 7:
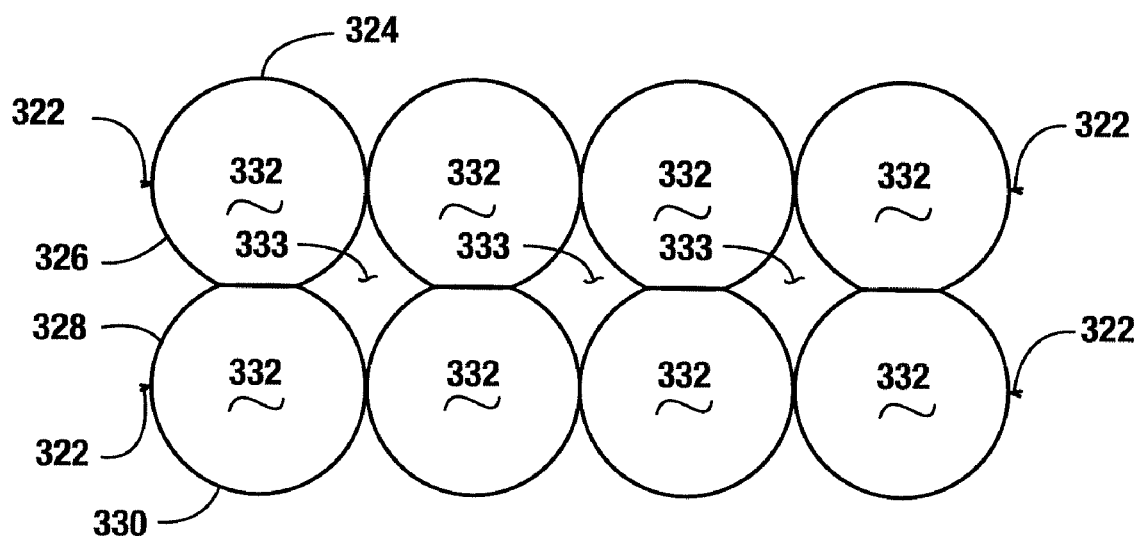
FIG. 7 is a top view of a heat-shrunken holder as in FIG. 6C, with the articles removed for clarity.

FIG. 7 is a top view of a section through heat-shrunken holder 300, with the articles removed for clarity. As seen, shrinking helps draw the eight containers in to form a unitized shape, with all adjacent containers having at least one buffering piece of film between them for protection. Since the amount of film used from films 324-330 is somewhat equal, the resulting package is somewhat symmetrical.

Based on the size and shape of the articles to be packaged, the operation of forming zone as shown in FIG. 1A and the filling zone in FIG. 1B can be readily modified to form holder 300. For example, an even number of film supply rolls could be used, and the spreaders and sealers could be arranged as needed to form the desired configuration. It would be possible to first join two films to form an initial blank having one row of openings for articles, and then to join two or more of those blanks so as to create a package having more than one row. It would also be possible to join the films using a heat sealer while joining the blanks using an adhesive, or vice versa. The ultimate processes and machinery will depend on the desired package shape.

Figure 8A:
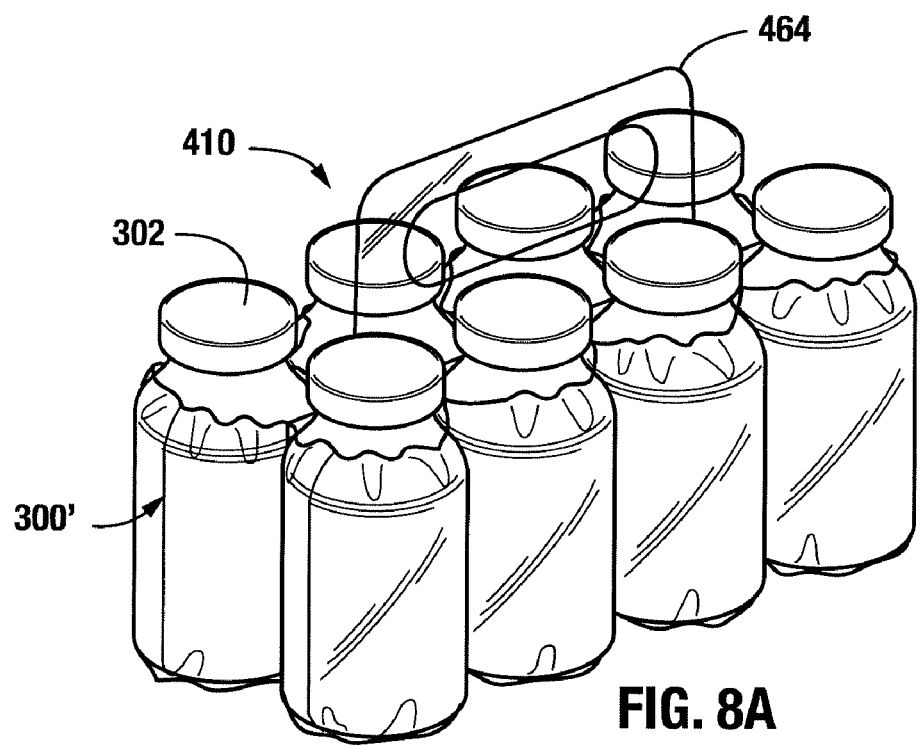
FIG. 8A is a perspective view of an alternate heat-shrunken holder and articles, wherein the holder includes an optional handle.
Figure 8B:
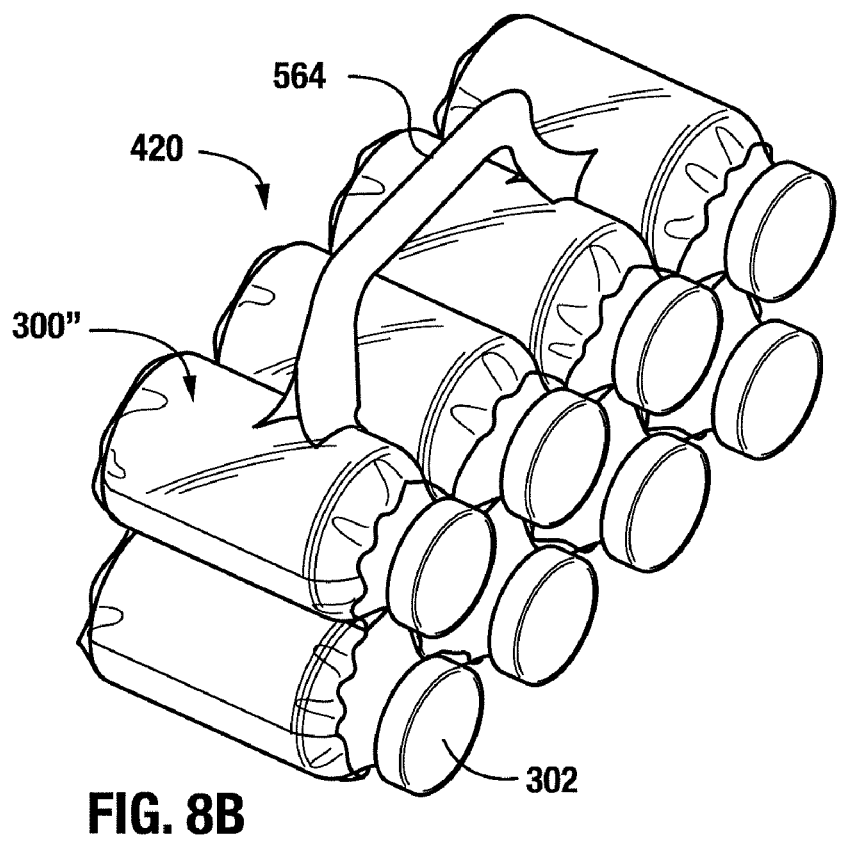
FIG. 8B is a perspective view of an alternate heat-shrunken holder and articles, wherein the holder includes an alternate optional handle.
Figure 9A:
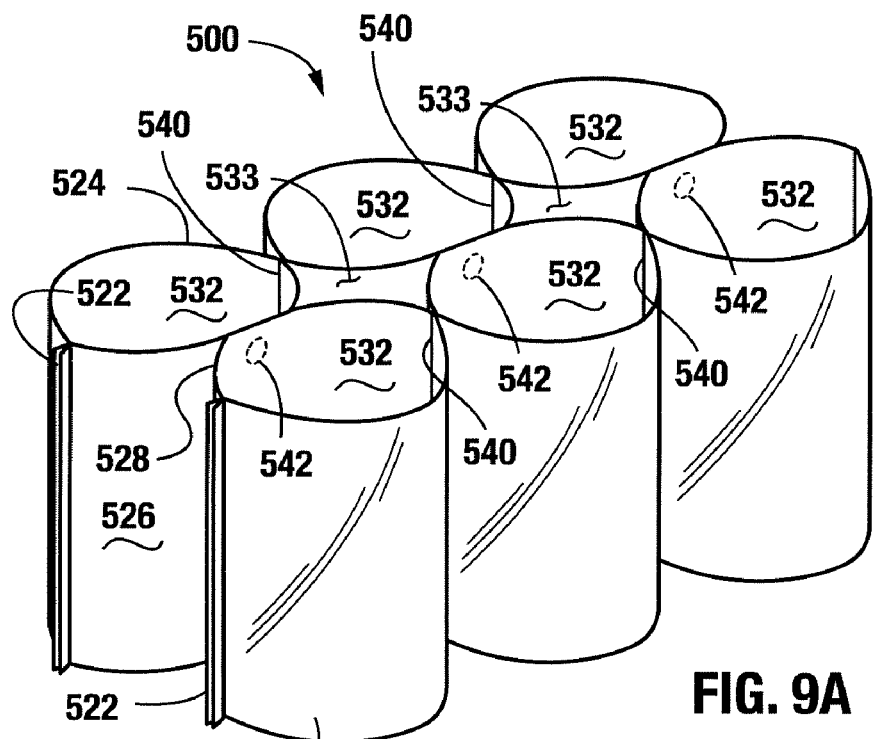
FIG. 9A is a perspective view of an alternate empty heat-shrinkable holder.
Figure 9B:
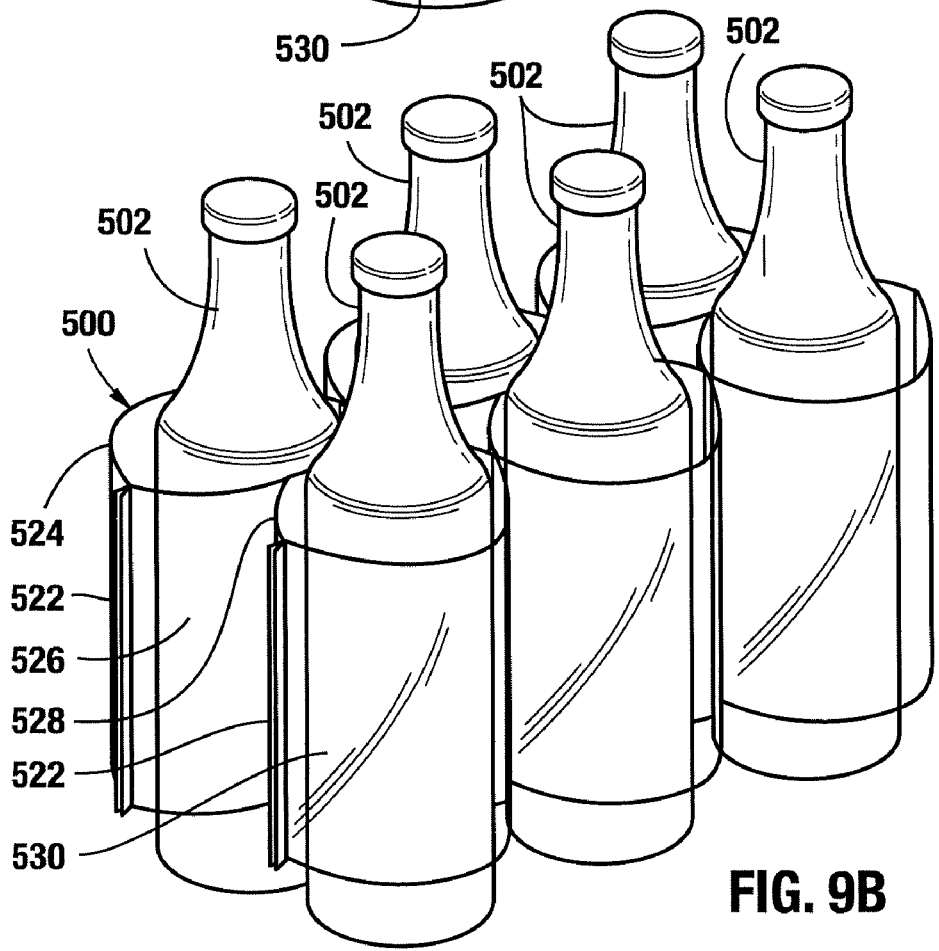
FIG. 9B is a perspective view of the heat shrinkable holder as in FIG. 9A, with articles located within the openings of the holder, before heat-shrinking.
Figure 9C:
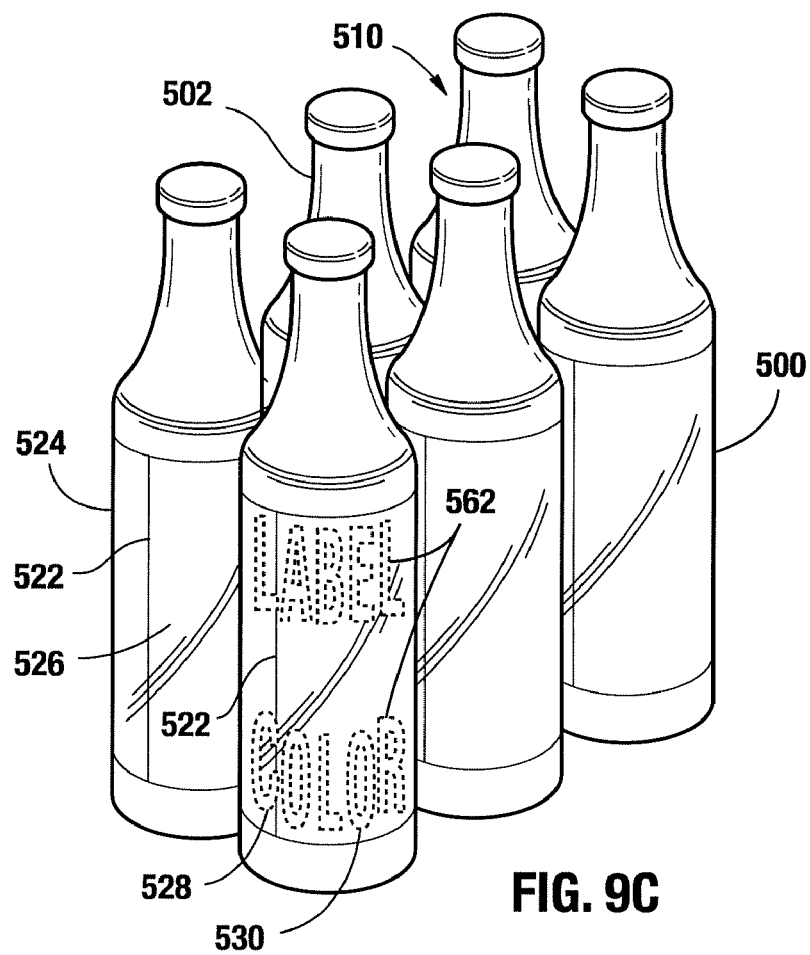
FIG. 9C is a perspective view of the holder and articles as in FIG. 9B, after heat-shrinking.
Figure 10:
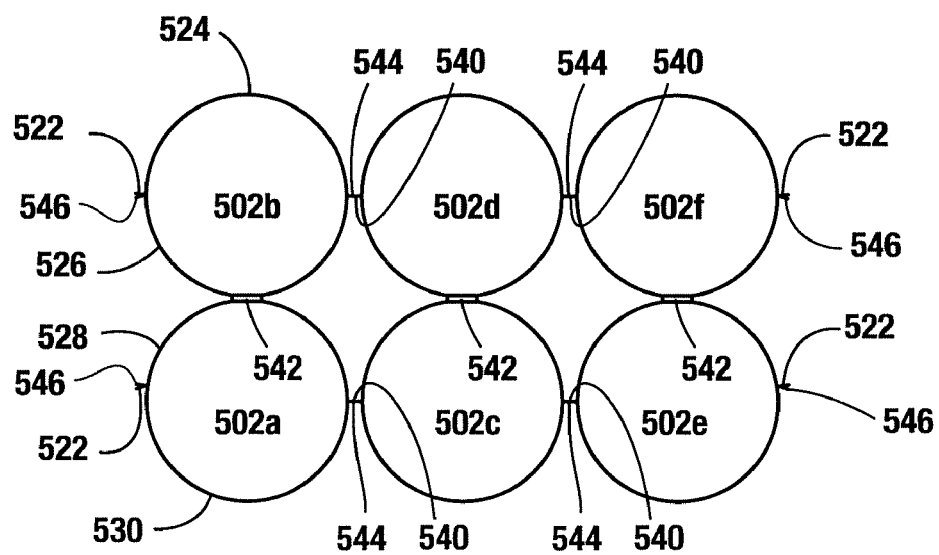
FIG. 10 is a top view of a heat-shrunken holder as in FIG. 9C, with the articles removed for clarity.

FIGS. 8A and 8B show two modifications to package 400 including handles. In FIG. 8A, package 410 includes a handle 464, similar to that shown above. Handle 464 may extend from one of the sheets forming holder 300' or may be an added sheet. In FIG. 8B, handle 564 of package 420 is attached to an outer sheet of holder 300". Handle 564 may be attached at any location via heat sealing or adhesive. Either handle may be made of shrinkable or nonshrinkable plastic or other materials, as desired. Handle 564 may also extend further around package for a more secure hold, if desired.

Various types of films may be used for the holders' films and handles, such as commercially available heat-shrink films, such as polyethylene (LLDPE, LDPE, HDPE), PVC, polypropylene, styrene copolymer, or the like. The ultimate material selected and its properties can be selected to achieve the needs of the size, shape, weight, and number of the articles being packaged, the method of shipment, sale and use, etc.

FIGS. 9-13 show yet another embodiment of a holder and package, in which the holder and label are dual-functioning. In fact, the holder and package are constructed so that upon removal of individual articles (such as containers) from the package, a commensurate portion of the holder is removed as well, comprising the label for the article, and leaving no "scrap" material behind. Therefore, waste and potential litter can be reduced, and recycling or other disposal can be improved.

More particularly, package 510 includes articles 502 held in place by holder 500. As illustrated, holder 500 holds six articles (in this case bottles) 502 in a six-pack orientation (two-by-three). Again, any number and arrangement of articles could be employed.

Holder 500 includes four films, 524, 526, 528, 530 arranged to hold the two rows of articles 502. If desired, holder 500 may be formed with heat seal portions 540 between articles in one direction, and a releasable fastener such as adhesive, glue, or other releasable fastener 542 in the other direction. In other words, strips of two films (524 and 526, or 528 and 530) could be formed by heat sealing 540 to form a row of openings 532 between adjacent heat sealing portions. Then, at least two of the two-film strips could be joined to form a holder 500 having multiple rows, as shown, thereby forming intermediate openings 533. Furthermore, perforations 544 may be formed at the heat seal portions 540 to provide separability of articles 502 from holder 500, and end perforations 546 may be formed to provide separability between two-film strips used to from holder 500. In the figures, the size of tails 522 and seal portions 540 are exaggerated for illustrative purposes. Tails 522 may also be sealed with the two films together in "one piece," rather than the two as shown. Such tails and seal portions need only be large enough to provide a seal and allow perforations to be created through them for separability. Reducing the size of these portions beneficially reduces the amount of raw material film used, reduces package weight, and may improve aesthetics by providing a smoother surface upon separation of articles, as described below.

Holder 500 could be formed using the structures and concepts disclosed in connection with FIGS. 1A and 1B, modified as needed for the particular application and holder size and shape. The releasable fastener 542 should hold articles 502 securely within holder 500, but should be releasable when a user pulls on it so as to allow separation between the adjacent two-film strips without tearing the strips adjacent the releasable fastener 542.

Figure 11:
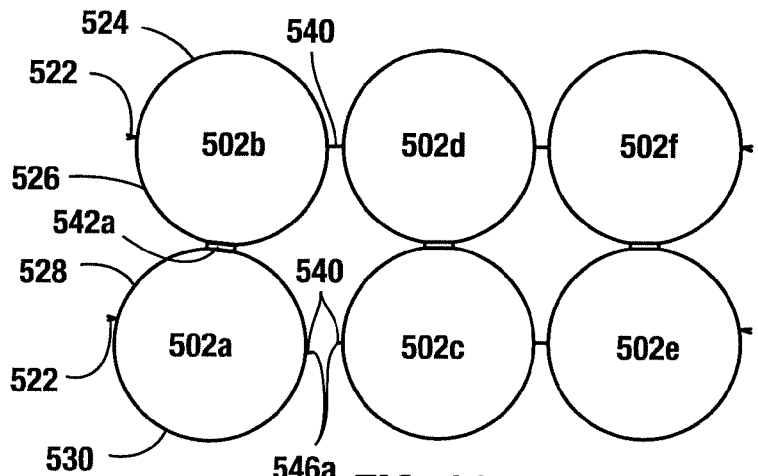
FIG. 11 is a top view of a heat-shrunken holder as in FIG. 10, with one perforation area torn.
Figure 12:
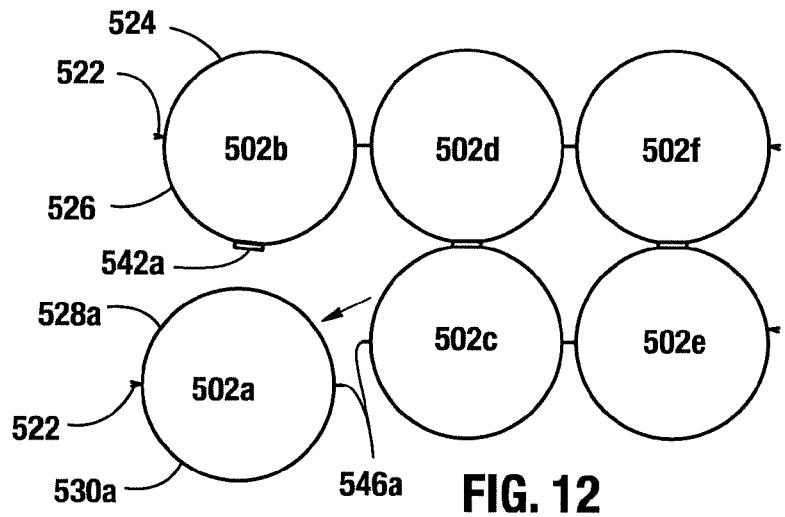
FIG. 12 is a top view of a heat-shrunken holder as in FIG. 11, with one releasable fastener separated to free one article from the holder and package.
Figure 13:
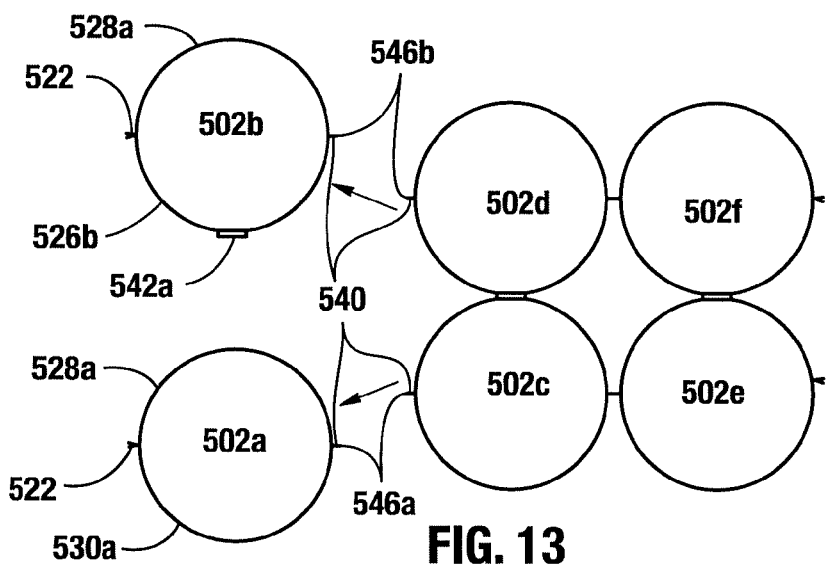
FIG. 13 is a top view of a heat-shrunken holder as in FIG. 12, with a second perforation area torn to free a second article from the holder and package.

Thus, as shown in FIGS. 11 and 12, to remove a single article 502a from an end of the package 510, one would pull on it until tearing occurred along one set of perforations 546a and separation occurred along one releasable fastener portion 542a. Either separation could occur first or it could occur simultaneously. Doing so would leave material from films 528 and 530 firmly attached to article around the entire circumference. As shown in FIG. 13, another article 502b can be removed by tearing further perforations 546b. Sequentially all articles could be removed from package 510. Notably, upon removal of an article, no waste is created or left hanging from either the article or holder 500.

If desired, printed indicia of any type 562 may be provided on some or all of film portions 528a and 530a to provide a color background, labeling, decoration, etc. Thus, once separated from package 510, holder film portions 528a and 530a would comprise a label for the article 502a. The holder 502 thus can serve double duty as the label to meet decorational, promotional, or legal labeling requirements. The films forming holder 502 could thus be fed into a forming systems, such as that in FIG. 1A in synchronization, for example using known elements such as visual sensors, timing marks, etc. (not shown), to provide feedback to the film drive to thereby match the front and back side film portions to create a unified label appearance.

Alternatively, holder 502 could have transparent or translucent properties, either along the entire film or in portions, allowing an additional label or printed matter on the article to show through. The individual films on article 502a could if desired be constructed to be designed to be removed in some fashion, by additional perforations, or embedded tear strips, etc., after separation from package 510. Also, a reveal could be provided by way of an opaque or other colored portion of the films that would obscure something on an article beneath the films, so as to provide a potential surprise to a consumer, a game, a prize depending on what appears beneath, etc. Such reveal could also be carried out by printing on the inside of the films (facing the article, not the outside), if such material is not readable from the outside of package 510, regardless of whether something appears on the article beneath the film.

Also, if desired, it may be useful to have at least a portion of the film be non-transparent, so as to cover up any underlying barcode appearing on the article or underlying label, where the underlying barcode contains information related to an individual article (as opposed to a group such as a six-pack). Further, the film may have on its outside single a barcode related to the package of articles, or each packaged article may have on the respective film portion on its outside a barcode related to an individual article. In that way, inaccurate payment and inventory information is less likely to be obtained, whether inadvertent or intentionally, at checkout. Such options are available based on the desired application, channel of trade, retail environment, etc.

Presently, films deemed suitable for such holder 510 include polypropylene, PET, PVC, OPS, shrink materials, and various polyethylene blends. Depending on application, the film thickness may be about 40-76 micron. Welding may be carried out using known film welding devices such as heat bar or a ni-chrome wire shielded with Teflon cloth, or other suitable device. The releasable fastener may comprise a glue, an adhesive, etc. For example, the fastener may comprise a strip or individual portions of pressure sensitive adhesive such as holt melt or cold seal. One suitable adhesive for certain applications is The Bemis Company, Inc., Mactac STW199013. The fastener may also comprise a tape, or a sacrificial weld that has a strength designed to separate before tearing of the films at undesired locations. Perforations may be carried out using a triggered wheel, bar, knife, etc. The perforations between articles should be sufficient in length and percentage to allow separation at a desired location before failure at an undesired location when a consumer wishes to remove an article from a package. The perforations should no be so substantial that the integrity of the package is compromised during assembly of package, shrinking, handling, shipping, etc. The parameters of the films, size of the openings, extent of the perforations and choice and orientation of the releasable fastener will all be dependent upon the size, shape, weight, and material or the articles being packaged, the orientation of the articles, the number of articles in total and in terms of rows and columns in a given package, etc.

If a glue, adhesive, tape, heat seal or the like is used for releasable fastener 542, it can be selected so that the joinder point will release from one or both of the sheets upon pulling by the end user to allow an article to separate, leaving the sheets intact. Alternately, such joinder point can be selected so that it will not release without potentially tearing the sheets (that is, a firmer grip). If so, it may be desirable to weaken the area around the joinder point, for example with perforations or the like. In such case, adhesive or the like could be applied to areas within perforations on one or both sheets, allowing for removal of the perforated area of the sheet as an article is removed. Thus, the releasable fastener as claimed can have many variations within the scope of the invention.

Figure 14:
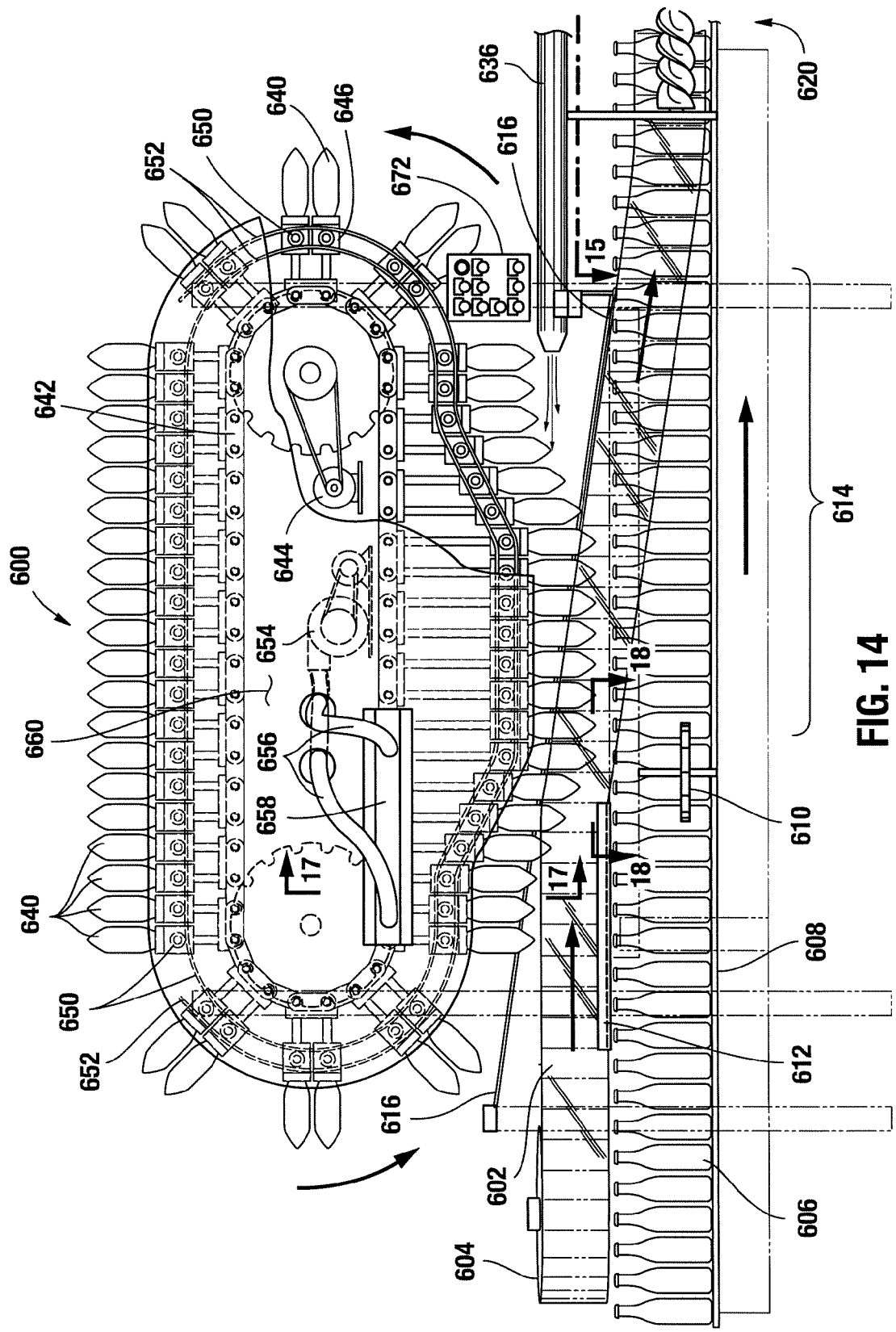
FIG. 14 is a side view of an assembly for applying blanks to articles.

FIGS. 14-20 show one example of a device useful for applying films to articles such as bottles. As shown, device 600 applies film blank 602 from roll 604 on to articles 606 fed on a conveyor 608, in this case double-file. The process moves from left to right as shown in FIG. 14. Articles 606 move to the right until they meet a timing device 610, in this case star wheels (See FIG. 18). Other timing devices could be used, or the articles could be carried on a gripper conveyor with predetermined spacing already achieved.

Blank 602 follows guide 612 to a placement area 614, starting near the star wheels in FIG. 14. A further guide 616 helps urge blank 602 downward. Openings 618 in blank strip 602 are synchronized with the articles 606, either by use of sensors, timing marks, etc., or simply by virtue of hand attachment of the blank to leading articles when the device is started. As conveyor 608 is operated, articles 606 move to the right and pull blank strip 602, thereby unwinding it off roll 604. Guides 612 and 616 direct blank 602 downward to a desired position with articles 606 in each opening 618.

Figure 15:
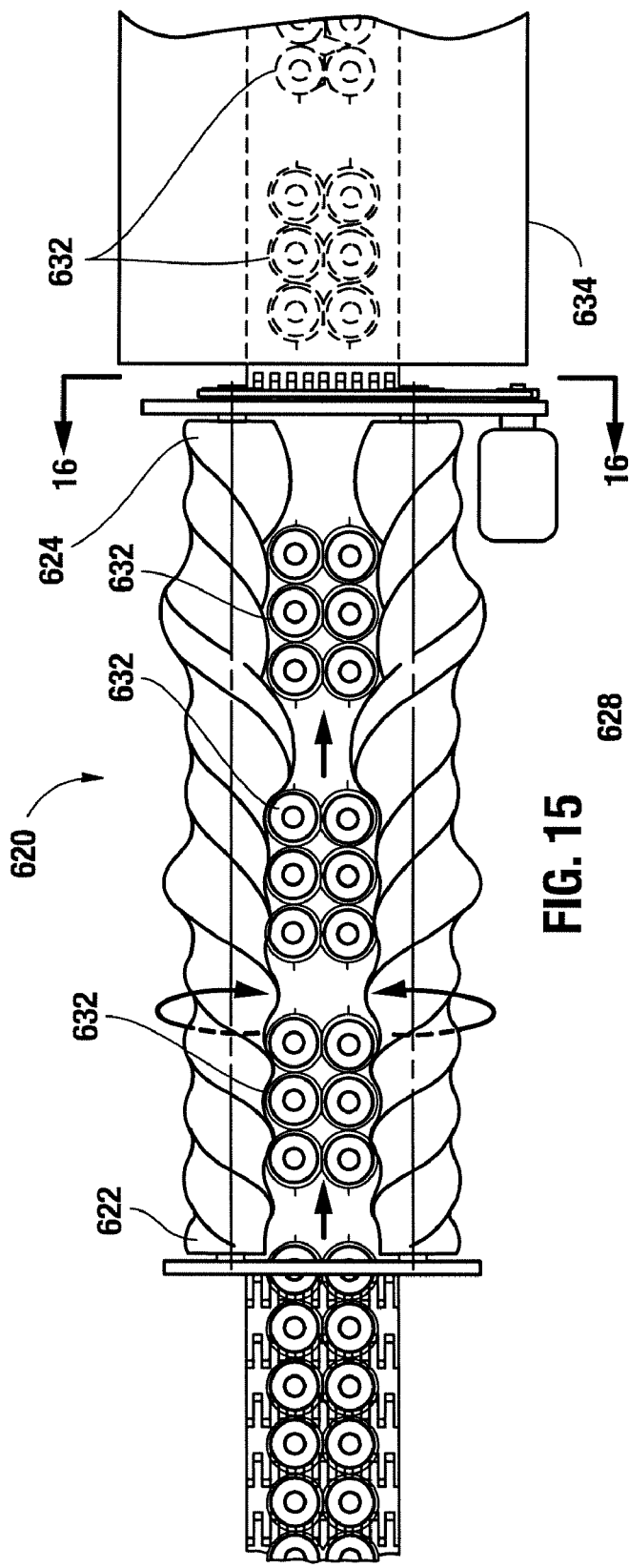
FIG. 15 is a top view of a portion of the assembly of FIG. 14, taken along line 15-15.
Figure 16:
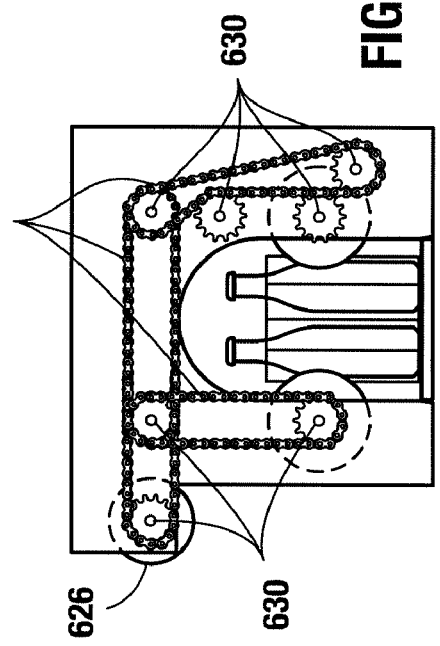
FIG. 16 is a side view of a portion of the assembly of FIG. 14, taken along line 16-16 in FIG. 15.
Figure 17:
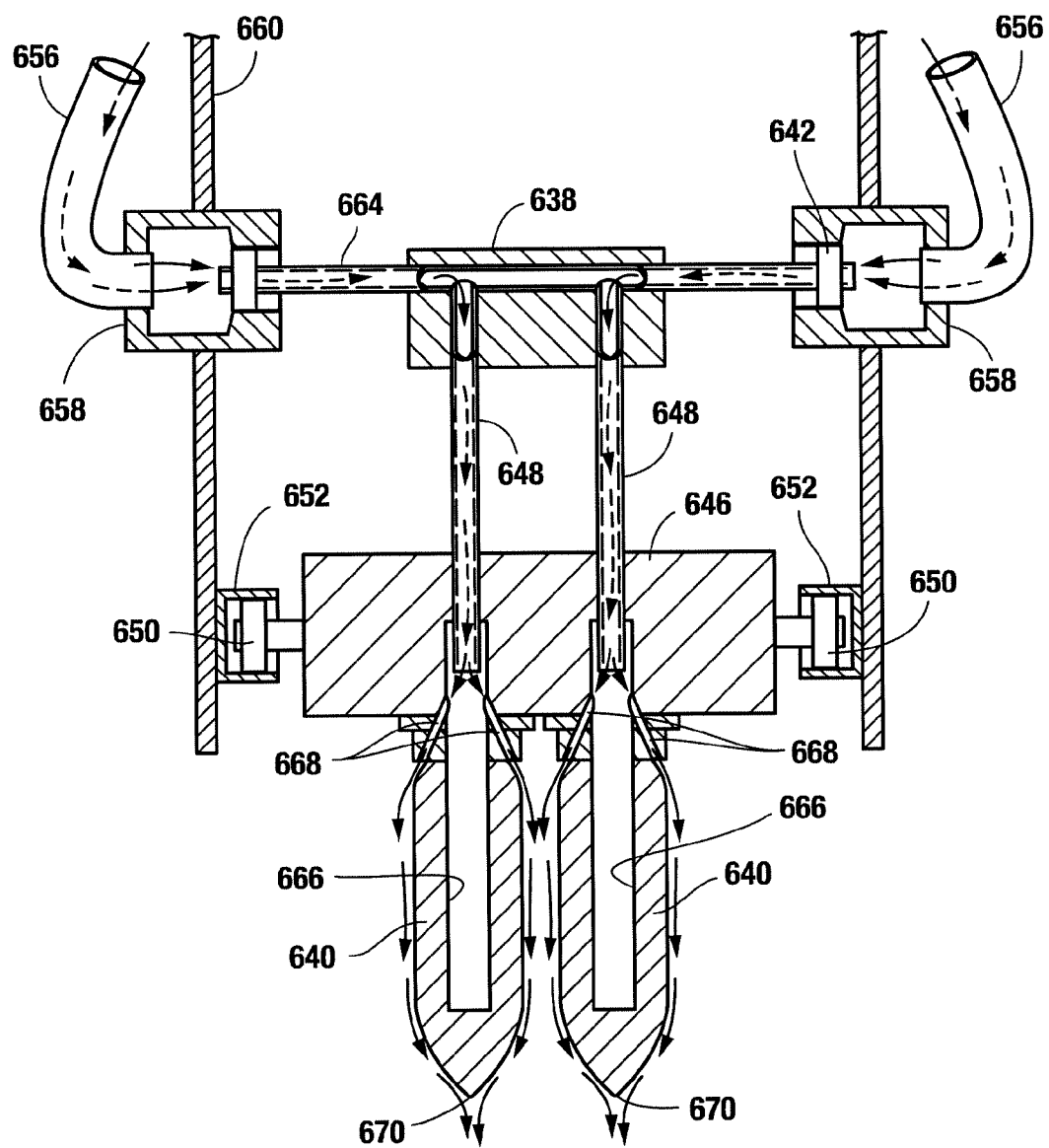
FIG. 17 is a sectional view of a portion of the assembly of FIG. 14, taken along line 17-17.
Figure 18:
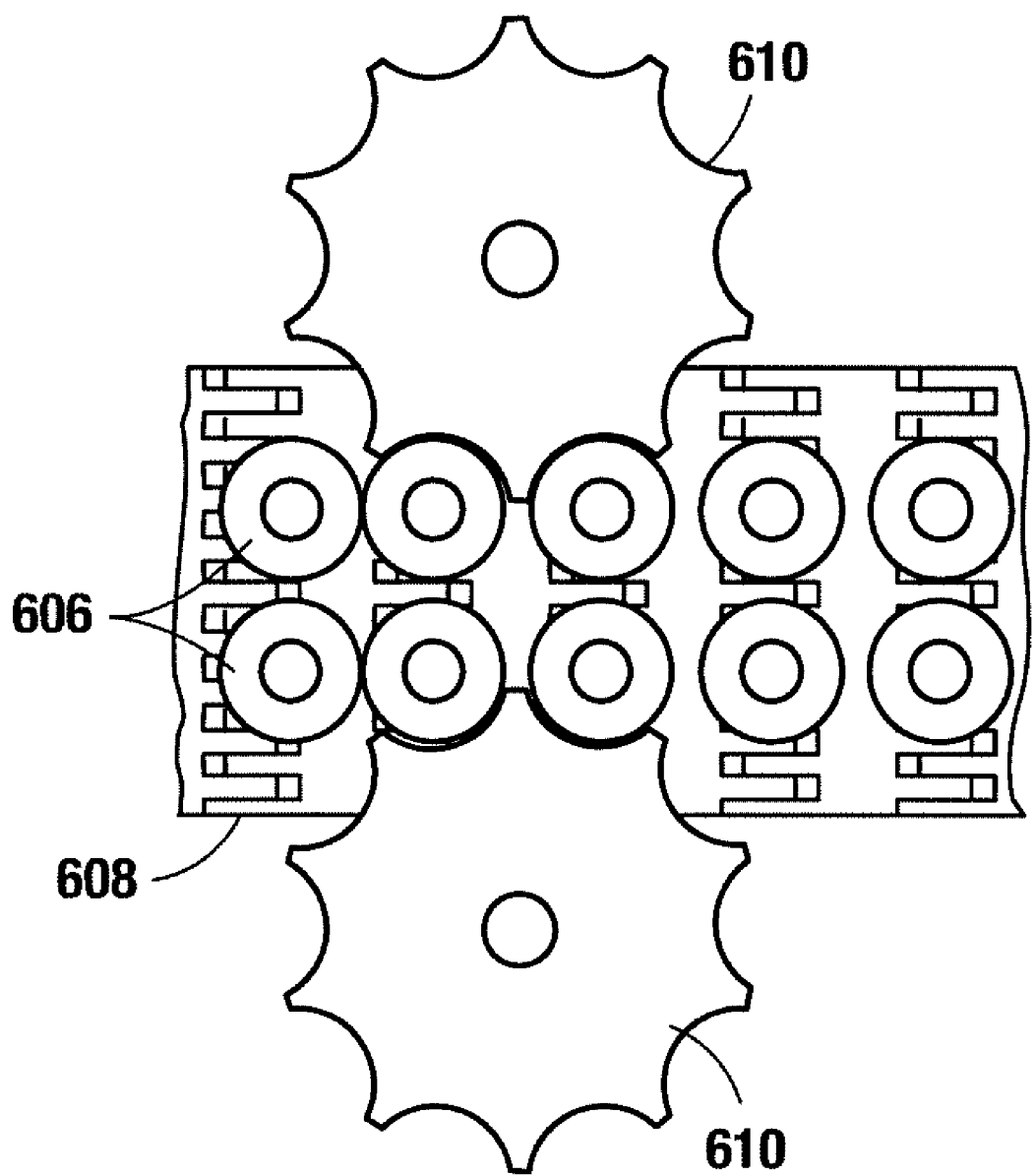
FIG. 18 is a top view of a portion of the assembly of FIG. 14, taken along line 18-18.
Figure 19:
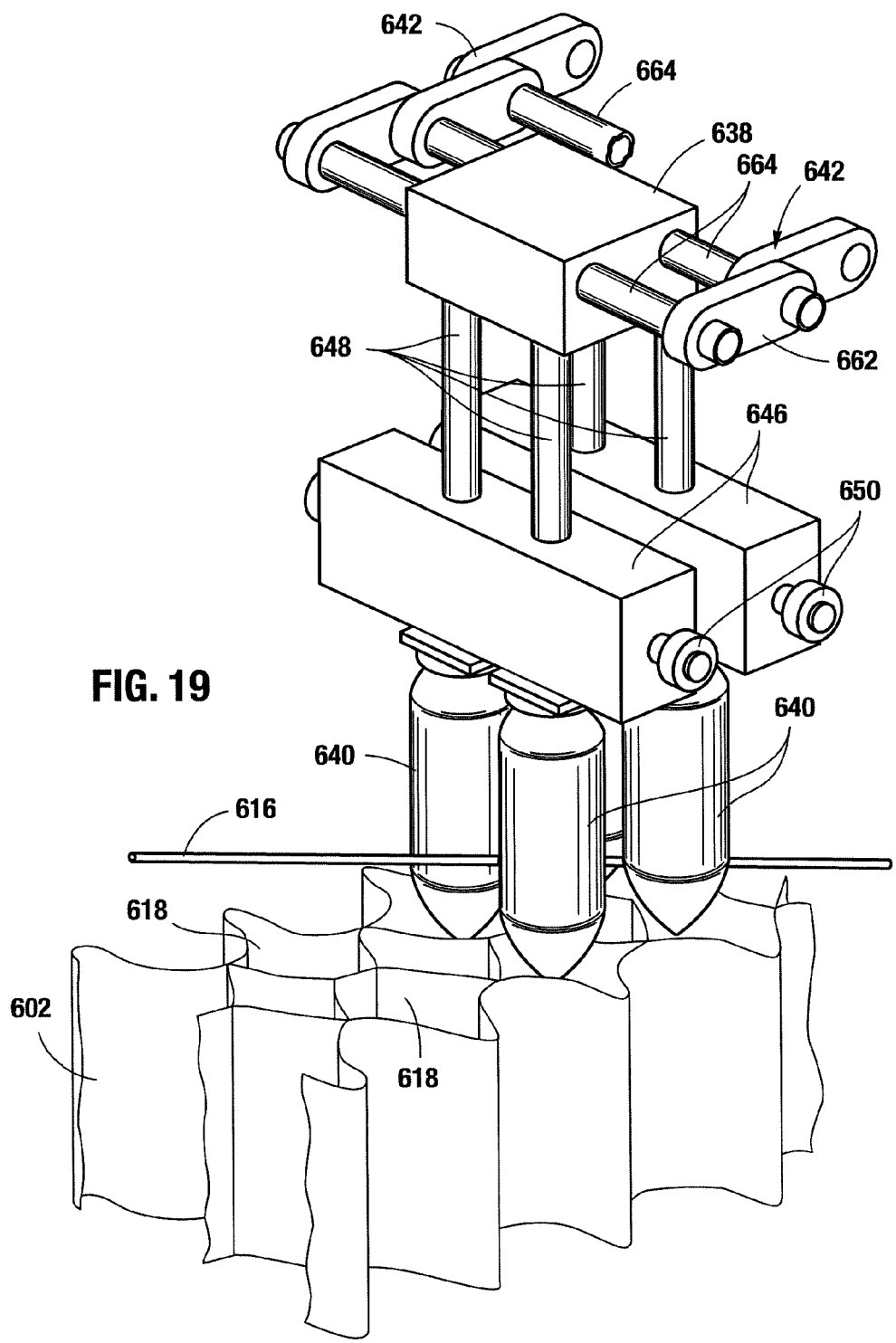
FIG. 19 is a perspective view of a portion of the assembly of FIG. 14 showing entry of the spreaders into the holder blank.
Figure 20:
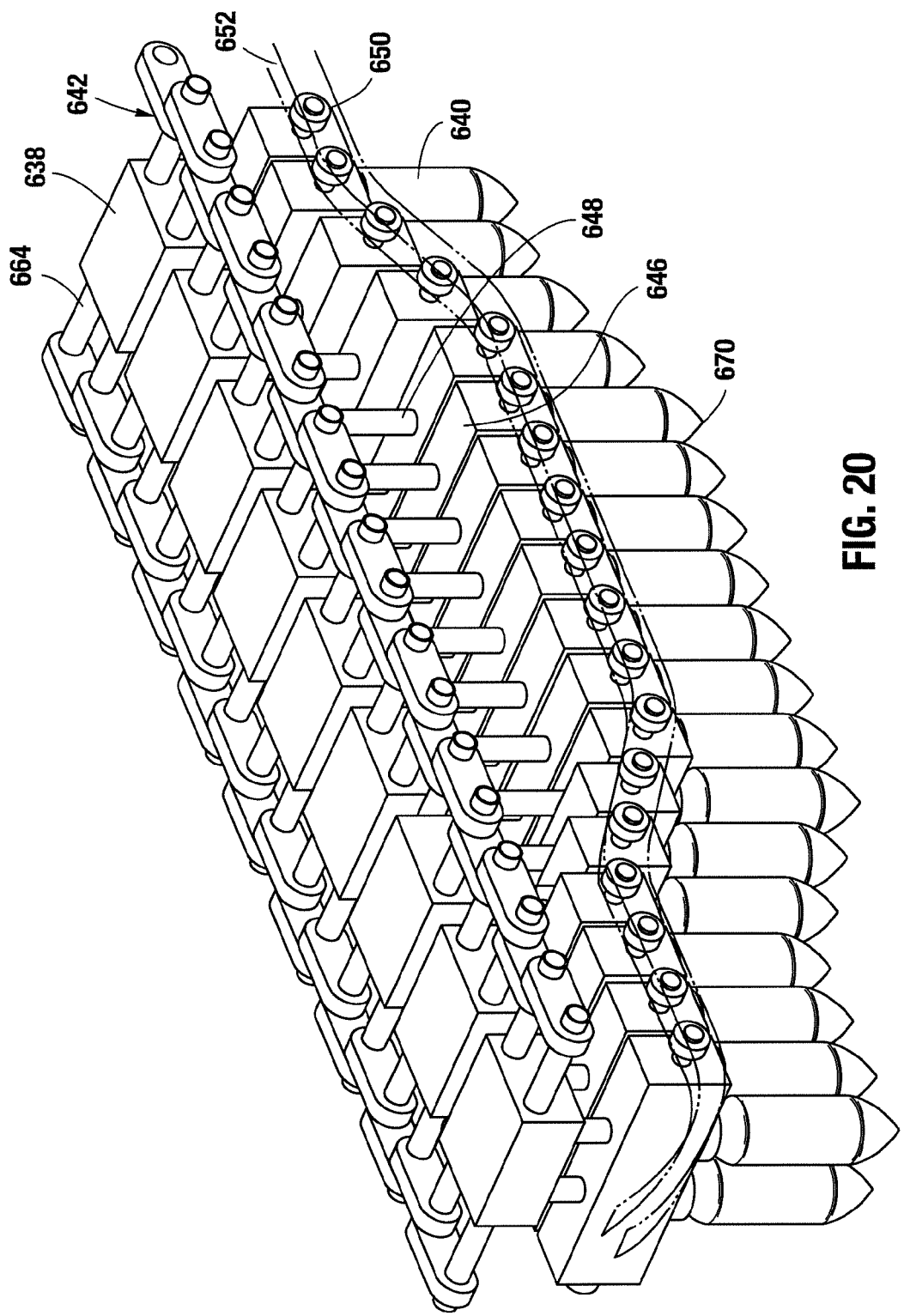
FIG. 20 is a perspective view of a portion of the spreader and air manifold section of the device of FIG. 14.

Separation devices 620, in this case screws, are located downstream from the placement area 614. As shown in FIG. 15, screws have non-uniform threading at a first end 622 to separate groups of articles according to perforations in films as the articles reach the second end 624. Separation devices 620 can be driven from a single drive input 626 via chains 628 and gearing 630. Separated groups of articles 632 are then fed into a heating unit 634, such as a heat tunnel, to shrink wrap the films and form the group of articles and film portion from blank 602 into a unitary package along the lines described above.

Additional devices may be employed to assist the placement of blank strip 602 over articles 606. For example, a blower 636 may be employed to blow along and downward against the blank within the placement area 614. Blower 636 can help slide the blank strips downward so that articles 606 end up in the desired openings 618 in the blank strips.

Also, separators 640 may be provided and driven in synchronicity with the articles 606 and blank strip 602. Each separator 640 fits in an opening 618 and functions to open and hold in place the opening so that the article will fit within it. Separators 640 are driven by a chain or chains 642 driven by a drive 644. Each separator 640 is mounted on a shuttle 646 that is slidably attached to a housing 638 attached to chain 642 via a support 648 (See FIG. 19). Shuttles 646 include wheels 650 that follow guide track 652. The guide track 652 may be contoured to drop separators 640 into openings 618 to provide a guide for the openings to slide on to articles 606. Supports 648 may extend into separators 640 when the separators are closer to chain 642.

If desired, a blower system may also be used with separators 640. As shown, blower 654 blows air via pipes 656 into manifolds 658 on the sides of housing 660. Links 662 of chain 642 are mounted on a hollow tube 664. When chain 642 is driven individual tubes 664 are pressurized when they reach manifolds 658. (Although manifolds are shown on both sides, it would be possible to use only one.) Tubes 664 are in fluid communication with respective supports 648, which are in fluid communication with an opening 666 within respective separators 640. Passages 668 through separators 640 allow the pressurized fluid to escape and travel downward along the outside of the separators. Such flow assists in the expanding of openings 618 within blank 602. As shown in FIG. 14, manifold 658 allows fluid to flow though such passages 668 before separators 640 are placed into openings 618, and such flow may continue for some time. If desired, such flow may continue until blank 602 begins to slide down onto articles 606.

Passages 668 should be large enough in size and number to provide sufficient flow to open openings 618 and/or assist sliding of blank 602 over articles 606. The shape of separator 640 assists in providing a smooth flow where desired, and the pointed tip 670 assists in aligning the separator with a desired opening 618. If desired, other shapes could be employed for separator 640, and alternate or additional passages cold be provided to allow fluid flow for a desired application, line speed, article, and/or blank. Device 600 and the respective conveyors, drives, blowers, etc. may be controlled by a controller 672, such as a PLC or the like as is available from Allen-Bradley or others.

If desired, the device above and blank could be modified slightly to provide separately sleeved articles during the manufacturing process. That is, blank 602 would be made of only two strips of film creating one row of openings 618 for articles 606. Device 600 would be modified also, for example by having only one row of separators 640. Separation devices 620 could be modified so that individual articles would be separated from each other, not separated into groups. Therefore, when the blank portion in the form of a heat-shrinkable sleeve enters heating unit 634, the sleeve is attached to the article, thereby potentially functioning as a label.

Using device 600 in such way to apply labels and/or sleeves to articles starting with film blanks has various benefits. First of all, if polyethylene is used, such film may be generally less expensive than other body sleevings in current use for articles such as containers. Also, a labeled container prepared in such way is achieved using a smaller factory footprint than in other arrangements, where for example, expensive adhesive applying and labeling machines might be required. Also, with minor change out of parts on device 600, a line could be put in place that could form either single article sleeves or multi-article packages.

It should be understood that other methods and devices could be employed to apply blanks to articles to assist in creating packages according to the above teachings. For example, suction, other blowers, fingers, or other mechanical means could be employed to spread and apply blank 602 to articles 606. And articles could be separated into group and made into packages in other ways. Further, such method need not occur with banks comprising two rows of openings or a six pack, etc., and practical number and/or orientation could be used.

Therefore, it should be understood that the types of holders, packages, articles, devices and methods utilized with the teachings of the present disclosure should not be limited to those embodiments shown herein. It should also be understood that features of the various embodiments above may be recombined in other ways to achieve still further embodiments within the scope of the present invention.

What is claimed is:

1. A heat-shrinkable holder for securing a plurality of articles, the holder comprising:
    at least a first and second blank strips, each first and second blank strip including:
    a first sheet formed of heat-shrinkable material and having a pre-shrinking length; and
    a second sheet formed of heat-shrinkable material substantially equal to the first sheet pre-shrinking length, the second sheet being joined to the first sheet at discrete joinder locations so as to create at least two openings therebetween, each of the openings sized larger than one of the articles, the first and second sheets including perforations at the discrete joinder locations; and
    releasable fastener portions for holding the first blank strip to the second blank strip, the releasable fastener portions being located between the second sheet of the first blank strip and the first sheet of the second blank strip and a second sheet of a second strip at locations spaced from the perforations; each of the first and second sheets being heat-shrinkable to an extent to secure one of the articles on each opening, a portion of one of the first sheets and a portion of one of the second sheets securing one of the articles being removable from the holder by tearing at the perforations and by release of the releasable fastener portion.

2. The holder of claim 1, wherein the holder is configured with six openings for securing six articles in a two-by-three arrangement.

3. The holder of claim 1, wherein the articles do not contact each other directly when secured.

4. The holder of claim 1, wherein at least one of the first or second sheets includes printed indicia relating to the article.

5. The holder of claim 1, wherein the portion of the first sheet and the portion of the second sheet comprise a label for the article.

6. The holder of claim 1, wherein the first and second sheets are joined via at least one of heating or an adhesive.

7. The holder of claim 1, wherein the holder further includes an extending handle.

8. The holder of claim 1, wherein the articles are containers.

9. The holder of claim 1, wherein the perforations and releasable fastener portions are located so that upon removal of the portion of the first sheet, the portion of the second sheet and the article, the holder and remaining articles are an intact package and no waste holder material is generated.

10. A package of articles comprising:
    a plurality of articles;
    at least a first and second blank strips, each first and second blank strip including:
    a first sheet formed of heat-shrinkable material and having a pre-shrinking length; and
    a second sheet formed of heat-shrinkable material substantially equal to the first sheet pre-shrinking length, the second sheet being joined to the first sheet at discrete joinder locations so as to create at least two openings therebetween, each of the openings sized larger than one of the articles, the first and second sheets including perforations at the discrete joinder locations; and
    releasable fastener portions for holding the first blank strip to the second blank strip, the releasable fastener portions being located between the second sheet of the first blank strip and the first sheet of the second blank strip and a second sheet of a second strip at locations spaced from the perforations; each of the first and second sheets being heat-shrinkable to an extent to secure one of the articles on each opening, a portion of one of the first sheets and a portion of one of the second sheets securing one of the articles being removable from the holder by tearing at the perforations and by release of the releasable fastener portion.

11. The package of claim 10, wherein the articles do not contact each other directly when secured.

12. The package of claim 10, wherein at least one of the first or second sheets includes printed indicia relating to the article.

13. The package of claim 10, wherein the first and second sheets are joined via at least one of heating or an adhesive.

14. The package of claim 10, wherein the perforations and releasable fastener portions are located so that upon removal of the portion of the first sheet, the portion of the second sheet and the article, the holder and remaining articles are an intact package and no waste holder material is generated.

15. A package of articles comprising:
    a plurality of articles; and
    a holder including at least four sheets of heat-shrunken material having substantially equal pre-shrinking lengths, the sheets being joined at a plurality of discrete joinder portions thereby forming a plurality of openings arranged in at least two rows, perforations being formed at the joinder portions and releasable fastener portions being formed between the innermost two sheets spaced from the perforations, each opening sized to secure an article therein, the heat-shrunken material and articles thereby forming a unitary heat-shrunken package configured with a plurality of articles arranged in the at least two rows, individual articles being separable from the package by tearing at a respective one of the perforations once separating at a respective one of the releasable fasteners without generating waste holder material.

16. The package of claim 15, wherein the package is configured so that articles do not contact each other directly when secured.

17. The package of claim 15, wherein at least one of the sheets includes printed indicia relating to the article.

18. The package of claim 15, wherein the perforations and releasable fastener portions are located so that upon removal of the portion of the first sheet, the portion of the second sheet and the article, the holder and remaining articles are an intact package and no waste holder material is generated.

19. A heat-shrinkable holder for securing a plurality of articles, the holder comprising:
    at least four sheets of heat-shrunken material having substantially equal pre-shrinking lengths, the sheets being joined at a plurality of discrete joinder portions thereby forming a plurality of openings arranged in at least two rows, perforations being formed at the joinder portions and releasable fastener portions being formed between the innermost two sheets spaced from the perforations, each opening sized to secure an article therein, the heat-shrunken material and articles thereby forming a unitary heat-shrunken package configured with a plurality of articles arranged in the at least two rows, individual articles being separable from the package by tearing at a respective one of the perforations once separating at a respective one of the releasable fasteners without generating waste holder material.

20. The holder of claim 19, wherein the perforations and releasable fastener portions are located so that upon removal of the portion of the first sheet, the portion of the second sheet and the article, the holder and remaining articles are an intact package and no waste holder material is generated.

21. The holder of claim 19, wherein at least one of the sheets includes printed indicia relating to the article.

* * * * *

UNITED STATES PATENT AND TRADEMARK OFFICE
CERTIFICATE OF CORRECTION

| | | |
|---|---|---|
| PATENT NO. | : 7,832,553 B2 | Page 1 of 1 |
| APPLICATION NO. | : 12/133153 | |
| DATED | : November 16, 2010 | |
| INVENTOR(S) | : Hartness et al. | |

It is certified that error appears in the above-identified patent and that said Letters Patent is hereby corrected as shown below:

Column 15, lines 29-30, after the words "second black strip" please delete the following "and a second sheet of a second strip".

Column 16, lines 8-9, after the words "second black strip" please delete the following "and a second sheet of a second strip".

Column 16, line 35 after the words "arranged in" please insert the word --the--.

Signed and Sealed this
Fourth Day of October, 2011

David J. Kappos
*Director of the United States Patent and Trademark Office*